(12) United States Patent
Mueck et al.

(10) Patent No.: US 10,477,491 B2
(45) Date of Patent: Nov. 12, 2019

(54) UPLINK INTERFERENCE MANAGEMENT IN SHARED SPECTRUM NETWORKS

(71) Applicant: Intel Corporation, Santa Clara, CA (US)

(72) Inventors: Markus Dominik Mueck, Unterhaching (DE); Ying He, Sydney (AU); Beeshanga Jayawickrama, Sydney (AU); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/041,941

(22) Filed: Jul. 23, 2018

(65) Prior Publication Data

US 2019/0007909 A1   Jan. 3, 2019

Related U.S. Application Data

(63) Continuation of application No. 14/998,116, filed on Dec. 24, 2015, now abandoned.

(51) Int. Cl.
*H04W 16/14* (2009.01)
*H04W 52/24* (2009.01)
*H04W 24/02* (2009.01)
*H04W 52/14* (2009.01)

(52) U.S. Cl.
CPC ......... *H04W 52/243* (2013.01); *H04W 16/14* (2013.01); *H04W 24/02* (2013.01); *H04W 52/146* (2013.01)

(58) Field of Classification Search
CPC ............ H04W 52/146; H04W 52/243; H04W 52/244
USPC ................................ 455/63.1–63.3, 69, 522
See application file for complete search history.

(56) References Cited

U.S. PATENT DOCUMENTS 8,311,570 B2 * 11/2012 Richardson ........... H04W 36/12
455/522
8,325,621 B2 * 12/2012 Simonsson ........... H04W 52/40
370/252
8,515,353 B2 * 8/2013 Hiltunen ............... H04W 16/16
455/41.2

(Continued)

*Primary Examiner* — Edward F Urban
*Assistant Examiner* — Rui M Hu
(74) *Attorney, Agent, or Firm* — Viering, Jentschura & Partner MBB

(57) ABSTRACT

A network control system configured to manage radio communication devices for a Spectrum Access System (SAS) shared spectrum wireless network is disclosed. The network control system may include a receiver to receive an estimate of a proximity to a Priority Access License (PAL) radio communication device for a plurality of user terminals. The estimate may be based on measurements of signals transmitted by the PAL radio communication device. The network control system may also include a processor configured to cause a user terminal to be configured to perform measurements based on the estimate of the proximity to the PAL radio communication device. The performed measurements may include an interference measurement indicative of interference to the PAL radio communication device from a General Authorized Access (GAA) radio communication device.

14 Claims, 10 Drawing Sheets

(56) References Cited

U.S. PATENT DOCUMENTS

| | | | | |
|---|---|---|---|---|
| 9,019,905 B2* | 4/2015 | Kazmi | ............... | H04W 52/146 370/329 |
| 9,026,055 B2* | 5/2015 | Talwar | .............. | H04W 72/0473 455/63.1 |
| 9,537,673 B2* | 1/2017 | Afkhami | ............. | H04L 12/4625 |
| 2006/0045046 A1* | 3/2006 | Kim | ................... | H04W 52/146 370/329 |
| 2008/0009306 A1* | 1/2008 | Suga | .................... | H04W 52/10 455/522 |
| 2008/0146154 A1* | 6/2008 | Claussen | ............. | H04W 52/244 455/63.1 |
| 2009/0092059 A1* | 4/2009 | Fu | ....................... | H04W 72/082 370/252 |
| 2009/0109939 A1* | 4/2009 | Bhushan | ............. | H04W 72/082 370/337 |
| 2009/0233554 A1* | 9/2009 | Cordeiro | ............. | H04B 7/0682 455/63.1 |
| 2010/0069010 A1* | 3/2010 | Karakayali | ............ | H04B 7/024 455/63.1 |
| 2010/0087221 A1* | 4/2010 | Srinivasan | ............ | H04W 16/08 455/522 |
| 2010/0099424 A1* | 4/2010 | Centonza | ............. | H04W 52/244 455/450 |
| 2010/0113026 A1* | 5/2010 | Narasimha | ............ | H04W 48/02 455/436 |
| 2010/0234040 A1* | 9/2010 | Palanki | ................ | H04L 5/0073 455/452.2 |
| 2010/0323711 A1* | 12/2010 | Damnjanovic | ...... | H04B 7/0617 455/450 |
| 2011/0009065 A1* | 1/2011 | Carter | ................... | H04W 24/08 455/63.1 |
| 2011/0207499 A1* | 8/2011 | Liu | ...................... | H04W 52/146 455/522 |
| 2012/0142364 A1* | 6/2012 | Duan | .................. | H04W 52/244 455/450 |
| 2012/0252524 A1* | 10/2012 | Gora | ................... | H04W 52/146 455/522 |
| 2012/0289278 A1* | 11/2012 | Huschke | ............. | H04W 52/146 455/522 |
| 2013/0012135 A1* | 1/2013 | Ruohonen | ............. | H04B 1/406 455/63.1 |
| 2013/0039194 A1* | 2/2013 | Siomina | ............. | H04W 52/244 370/252 |
| 2013/0122924 A1* | 5/2013 | Yie | ..................... | H04W 72/082 455/452.2 |
| 2014/0036786 A1* | 2/2014 | Kazmi | ................ | H04W 52/146 370/329 |
| 2014/0044095 A1* | 2/2014 | Li | ......................... | H04W 16/14 370/331 |
| 2015/0319708 A1* | 11/2015 | Otonari | ................ | H04W 52/32 370/329 |
| 2015/0333852 A1* | 11/2015 | Yoshizawa | ............ | H04W 36/04 370/252 |
| 2016/0183269 A1* | 6/2016 | Badic | .................... | H04B 15/00 455/454 |

* cited by examiner

UPLINK INTERFERENCE MANAGEMENT IN SHARED SPECTRUM NETWORKS

CROSS REFERENCE TO RELATED APPLICATION

This application is a Continuation and claims priority to U.S. application Ser. No. 14/998,116 filed on Dec. 24, 2015, which is incorporated by reference herein in its entirety and for all purposes.

TECHNICAL FIELD

Various embodiments relate generally to managing radio communication devices for a Spectrum Access System (SAS) shared spectrum wireless network for uplink interference control in shared spectrum networks.

BACKGROUND

Recent developments in radio frequency licensing such as spectrum sharing have introduced new possibilities for Mobile Network Operators (MNOs). In particular, Licensed Spectrum Access (LSA, proposed mainly for Europe in the 2.3-2.4 GHz bands) and Spectrum Access System (SAS, proposed mainly in the U.S. for the 3.55-3.7 bands) may open up access to previously restricted wireless frequency bands for mobile communications by allowing MNOs to share certain spectrum bands with "incumbent" users.

While the frequency bands targeted by LSA and SAS may be licensed and/or owned by incumbents (such as e.g. for government use), the targeted frequency bands are relatively underutilized over time and/or space. For example, incumbents may only rarely utilize the targeted frequency bands, and/or may only employ the targeted frequency bands in certain areas. Accordingly, both LSA and SAS propose similar systems in which the targeted frequency bands may be made available to cellular MNOs in scenarios, i.e. temporally and/or geographically dependent, in which the incumbent is not occupying the band. For example, one or more MNOs may be granted access to the targeted frequency bands in scenarios where the incumbent is not actively occupying the targeted frequency bands in a particular geographic area. MNOs may thus utilize the newly available bandwidth for mobile communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
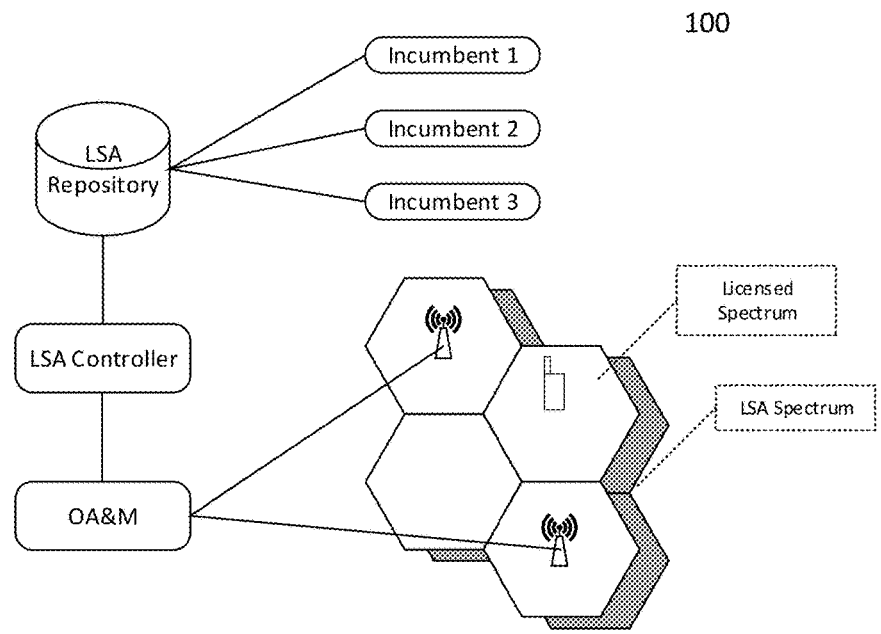
FIG. 1 shows a network architecture for an LSA network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. Accordingly it is understood that references to a "circuit" may refer to two or more circuits that collectively form a single circuit.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

The following description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. The examples provided herein are thus understood as being applicable to various other mobile communication technologies, both existing and not yet formulated, particularly in cases where such mobile communication.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified.

In spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands), Mobile Network Operators (MNOs) may be granted access to previously restricted radio frequency bands. Accordingly, an SAS or LSA "licensee" may license certain targeted frequency bands from "incumbents", and thus may be able to utilize the shared frequency bands.

While the targeted frequency bands for LSA and SAS may already be officially licensed and/or owned by the incumbents (mainly related to government use), the targeted frequency bands may be underutilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

As indicated above, LSA has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g. an MNO or any other entity that operates a wireless network) may operate a 3GPP LTE network on licensed shared basis, where an licensee may engage in a multi-year sharing contract with an incumbent (such as e.g. 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

FIG. 1 shows block diagram 100 illustrating an LSA network architecture. As shown in FIG. 1, LSA Spectrum Management relies on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In this operation operational approach, sensing mechanisms may not be required to support the system for identification of incumbent operation.

Similarly to LSA, proposed SAS arrangements may allow licensees to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Primary Access License" (PAL) users, may only be allocated a limited portion of the entire SAS band (e.g. the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 2:
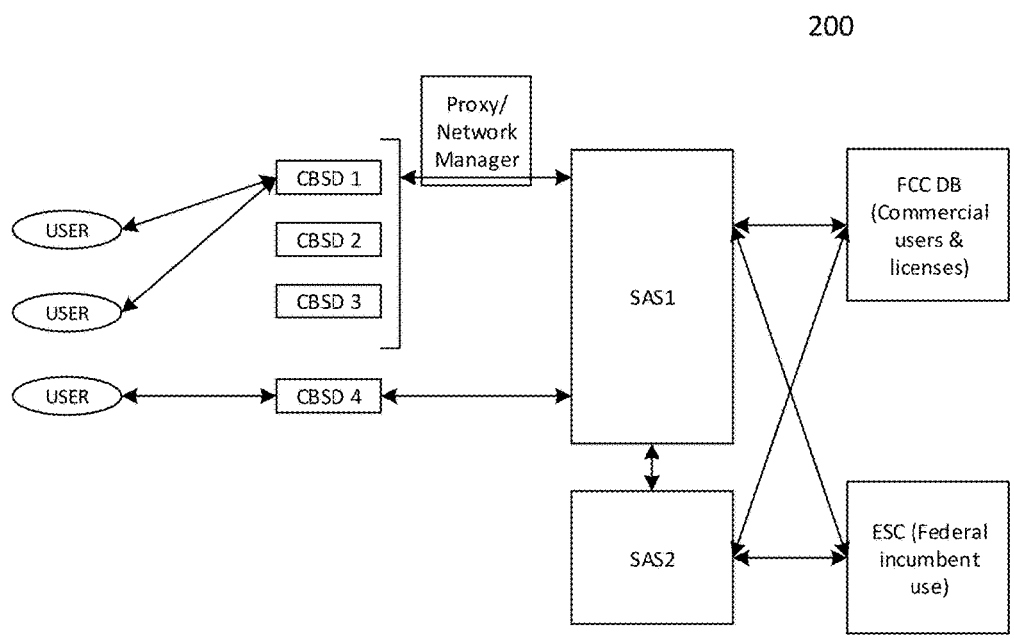
FIG. 2 shows a network architecture for an SAS network.

FIG. 2 shows block diagram 200 illustrating an SAS network architecture. In contrast to LSA, SAS may be designed to ensure coexistence between incumbent users that are not able to provide any a-priori information to a centralized database. In the context of SAS, incumbents may conventionally be military-related, and accordingly SAS systems may provide an Environmental Sensing Capability (ESC) to perform required sensing tasks. Spectrum access decisions for tier-2 (PAL) and tier-3 (GAA) users may be based on sensing results provided by an ESC.

Both LSA and SAS may additionally provide Quality of Service (QOS) guarantees to licensees, where a licensee that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 1 and 2, LSA and SAS systems may employ an LSA controller and SAS entity, respectively, to coordinate access between incumbents and secondary users (e.g. registered licensees). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), shared spectrum may be appropriate for use in a "supplemental" role. For example, given the variable availability of shared spectrum, it may be impractical (albeit possible) in many scenarios to realize a comprehensive wireless network entirely on shared spectrum. However, licensee MNOs may be able to utilize dedicated licensed spectrum (i.e. exclusively licensed by a licensee) in a primary role while allocating shared spectrum for supplemental uplink and/or downlink. Licensee MNOs may thus be able to rely on the constant availability of dedicated licensed spectrum while utilizing shared spectrum to increase bandwidth when the shared spectrum is available.

Accordingly, shared spectrum may be useful in carrier aggregation schemes, which may commonly have a "primary" carrier and one or more "secondary" carriers. Accordingly, licensees may use shared spectrum for secondary carriers to complement the primary carriers composed of dedicated licensed spectrum. Licensees may employ shared spectrum in this manner in either a supplemental downlink (SDL) or supplemental uplink (SUL) role, and may even be able to adjust the relative balance of shared spectrum for SDL and SUL, such as by allocating a greater number of either uplink frames or downlink frames in a Time Division Duplexing (TDD) system or by allocating more of the shared spectrum bandwidth to either uplink or downlink in a Frequency Division Duplexing (FDD) system.

Many of the bands identified by the proposed LSA and SAS systems for European and American systems are employed in other regions as TDD bands for Third Generation Partnership Project (3GPP) networks. Accordingly, many Original Equipment Manufacturers (OEM) may already manufacture handsets configured to utilize the LSA and SAS spectrum for 3GPP TDD networks. Accordingly, it may be relatively straightforward for OEMs to enable manufactured handsets to additionally use the LSA and SAS bands for 3GPP TDD in other regions where the LSA and SAS bands were previously unavailable due to wireless frequency licensing restrictions. Regardless, shared spectrum may be utilized for any type of wireless network and thus are not limited to TDD-only use.

Accordingly, spectrum sharing systems may provide more bandwidth available for licensee use. However, even when granted access to shared spectrum by an incumbent, licensees may need to carefully monitor licensee radio activity in order to make sure incumbents are protected. As previously indicated, shared spectrum grants may be geographically-dependent, and a licensee may therefore be granted access to shared spectrum in a first geographical area while an incumbent maintains access to the same shared spectrum in a neighboring second geographical area. In order to effectively manage interference to the incumbent, spectrum sharing schemes may define geographical zones that place certain limitations on licensee radio activity in order to ensure that incumbents do not suffer from excessive interference.

For example, the current LSA proposal has specified three "zones": exclusion zones, restriction zones, and protection zones. An exclusion zone is specified as a geographical area within which LSA Licensees are not permitted to have active radio transmitters using the particular shared spectrum. Accordingly, incumbent cells may be located within such exclusion zones (although not exclusively limited to such), and licensee transmitters may therefore not be permitted to actively transmit using shared spectrum in order to prevent interference on the incumbent. Restriction zones are defined as geographical areas within which LSA Licensees are only allowed to operate radio transmitters according to certain restrictive conditions, such as maximum equivalent isotropically radiated power (EIRP) limits and/or constraints on antenna parameters. Lastly, protection zones are defined as geographical areas within which incumbent receives will not be subject to harmful interference caused by LSA Licensee transmissions, e.g. where the mean field strength does not exceed a defined value in $dB\mu V/m/MHz$.

SAS may employ similar designations of zones, where exclusion zones are equivalently defined as areas in which licensees may not have active radio transmitters operating on shared spectrum. SAS may similarly designate protection zones in which licensee operation must be protected; however, SAS may not utilize explicit restrictions based on mean field strength to define such protection. Regardless, protection of SAS incumbents in SAS protection zones may be treated similarly to protection of LSA incumbents in LSA protection zones, where interference is managed based on constraining the interference to the incumbent caused by a licensee to remain below certain levels.

Protection zones in both SAS and LSA may be of particular interest, as licensee transmitters may be allowed to utilize shared spectrum as long as the incumbent is sufficiently protected, which may as detailed above include ensuring that the aggregate interference to the incumbent caused by a licensee is below certain threshold levels. Licensees may therefore need to be able to accurately estimate current levels of interference to the incumbent as well as be able to employ effective transmit power control measures to reduce interference if necessary.

In a mobile communication context, it may be the responsibility of licensee base stations to evaluate the current levels of interference on an incumbent as well perform uplink and/or downlink power control if excessive interference levels are detected. While downlink transmissions by a licensee base station may cause some interference to an incumbent cell, downlink interference may be relatively limited due to the remote location of base stations relative to incumbent cells. Uplink transmissions by licensee user terminals on shared spectrum may however be more problematic as mobile terminals may venture proximate to or even into incumbent cells. Accordingly, licensee base stations may need to more thoroughly monitor uplink transmissions in order to ensure that interference to incumbents remains within the acceptable levels.

For example, a licensee base station may operate a conventional mobile communication system on licensed spectrum, and accordingly may be serving a number of mobile terminals. Additionally, the licensee base station may have been granted access to shared spectrum e.g. in an LSA or SAS context, and as a result may be able to utilize the shared spectrum for downlink and/or uplink. Although the licensee base station may primarily utilize shared spectrum for supplemental purposes, e.g. SDL and/or SUL, licensee base stations may alternatively utilize shared spectrum in a primary downlink and/or uplink role.

The licensee base station may be located proximate to an incumbent cell that is actively utilizing the same shared spectrum, such as in a protection zone. The licensee base station may therefore need to monitor and regulate interference caused to the incumbent by both downlink transmissions by the licensee base station and uplink transmissions by the served mobile terminals on the shared spectrum. Focusing on an uplink context, the licensee base station may need to perform uplink power control in order to ensure that uplink transmissions by the served mobile terminals do not result in excessive interference to the incumbent. The licensee base station may also need to ensure that uplink transmissions on shared spectrum by the served mobile terminals are detectable by the base station, and accordingly may need to balance the shared spectrum uplink allocation of the served mobile terminals to ensure that incumbents are protected as well as that uplink transmissions are detectable at the licensee base station.

As previously indicated, interference to incumbents on shared spectrum may be restricted according to predetermined thresholds or similar interference level criteria in protection zones. The licensee base station may thus need to evaluate the level of interference experienced by the incumbent cell in order to regulate uplink transmit power such that interference to the incumbent remains at or within the acceptable levels. Such may include both obtaining uplink interference estimates and executing uplink power control for licensee user terminals based on the obtained uplink interference measurements.

Licensee base stations may conventionally evaluate uplink interference to the incumbent by analyzing measurements provided by various licensee user terminals served by the licensee base station. For example, a licensee base station may assign licensee user terminals to measure uplink interference caused by the remaining licensee user terminals, and may consequently estimate the level of interference experienced by the incumbent cell in order to determine whether the current level of interference is acceptable or not.

If a licensee base station determines that the level of uplink interference to the incumbent is too high, e.g. above a predefined threshold, the licensee base station may execute uplink power control measures in order to reduce the uplink interference to within the permitted levels. Specifically, licensee base stations may select one or more licensee user terminals to prohibit from using shared spectrum for uplink and/or by reducing the permitted uplink transmit power for one or more licensee user terminals.

As the licensee may employ the shared spectrum in a supplemental uplink role (e.g. SUL), the restricted licensee user terminals may still be free to perform uplink activity on dedicated licensed spectrum, i.e. on a conventional mobile communication system operated by the licensee on dedicated licensed spectrum. Furthermore, assuming downlink interference to the incumbent remains tolerable, the restricted mobile terminals may still be able to utilize the shared spectrum in an SDL capacity. Licensee base stations may employ varying levels of such power control, which may include restricting some mobile terminals to only SDL as detailed above, restricting all mobile terminals to only SDL (which may include allocating all shared spectrum in time and frequency to downlink, e.g. for either a TDD or FDD context), or by restricting the SUL transmit powers of certain or all mobile terminals to reduced levels. It is again noted that shared spectrum may not be limited to only supplemental roles, and accordingly MNOs may operate a comprehensive wireless system (uplink and/or downlink) in a primary role on shared spectrum.

While performing such uplink power control may predictably reduce uplink interference to the incumbent, a random or arbitrary selection of licensee user terminals for power control may not be particularly efficient. For example, due to the dispersed distribution of licensee user terminals, certain licensee user terminals may be located relatively close to the incumbent cell while other licensee user terminals situated on the opposite edge of the coverage area of the licensee base station may be located far from the incumbent cell. Accordingly, the licensee user terminals proximate to the incumbent cell may contribute appreciably higher levels of interference to the incumbent while distant licensee user terminals may cause relatively low level of interference. As a result, arbitrary (e.g. selecting certain licensee user terminals to restrict from shared spectrum uplink or selecting certain licensee user terminals to allot reduced shared spectrum uplink transmit power) or uniform (e.g. prohibiting shared spectrum uplink for all licensee user terminals or reducing shared spectrum uplink transmit power for all license user terminals) application of power control procedures to all licensee user terminals may not be optimal. For example, reducing uplink transmit power allowances for licensee user terminals located far from the incumbent may not be productive, as such licensee user terminals may only contribute minimally to the interference seen by the incumbent. Randomly selecting licensee user terminals to restrict uplink transmissions for and/or applying uniform power control to all licensee user terminals may thus not be optimal in terms of managing uplink interference to incumbents.

Furthermore, licensee base stations may need accurate uplink interference estimations in order to decide whether to perform uplink power control. For example, inaccurate interference measurements may result in either unnecessary power control (e.g. if interference measurements are too high) or in excessive unmitigated interference to the incumbent (e.g. if interference measurements are too low). As previously indicated, licensee base stations may rely on mobile terminals to perform and report radio measurements back to the licensee base station for evaluation.

Accordingly, efficient licensee uplink operation on shared spectrum in protection zones may include both accurate interference measurements and effective application of power control procedures.

Furthermore, it is noted that the uplink interference estimation and power control procedures detailed herein are not limited to shared spectrum schemes such as LSA and SAS. For example, the uplink interference estimation and power control procedures may be equivalently employed by any entity that operates a wireless network in proximity to another entity on common frequency bands, which may or may not directly overlap (e.g. may utilize adjacent frequency bands that cause leakage interference onto one another). For example, spectrum licensing in the United States may allow for a first MNO and second MNO to utilize the same frequency band in adjacent geographical areas. As a result, uplink transmissions by the first MNO may cause interference to the second MNO, such as if user terminals of the first MNO are located close to or within the coverage area of the second MNO. Accordingly, the first MNO may implement uplink interference estimation and power control procedures in order to manage interference to the second MNO. Furthermore, SAS schemes may even shared the same frequency bands between an incumbent and more than one MNO, such as where a first MNO licenses a shared spectrum band from an incumbent in a first geographical region and a second MNO licenses that same shared spectrum band from the same incumbent in a second geographical region. Accordingly, the first MNO and second MNO may need to consider interference to the incumbent as well as to the other MNO. Many such scenarios are possible and thus recognized as applicable in the context of this disclosure.

Figure 3:
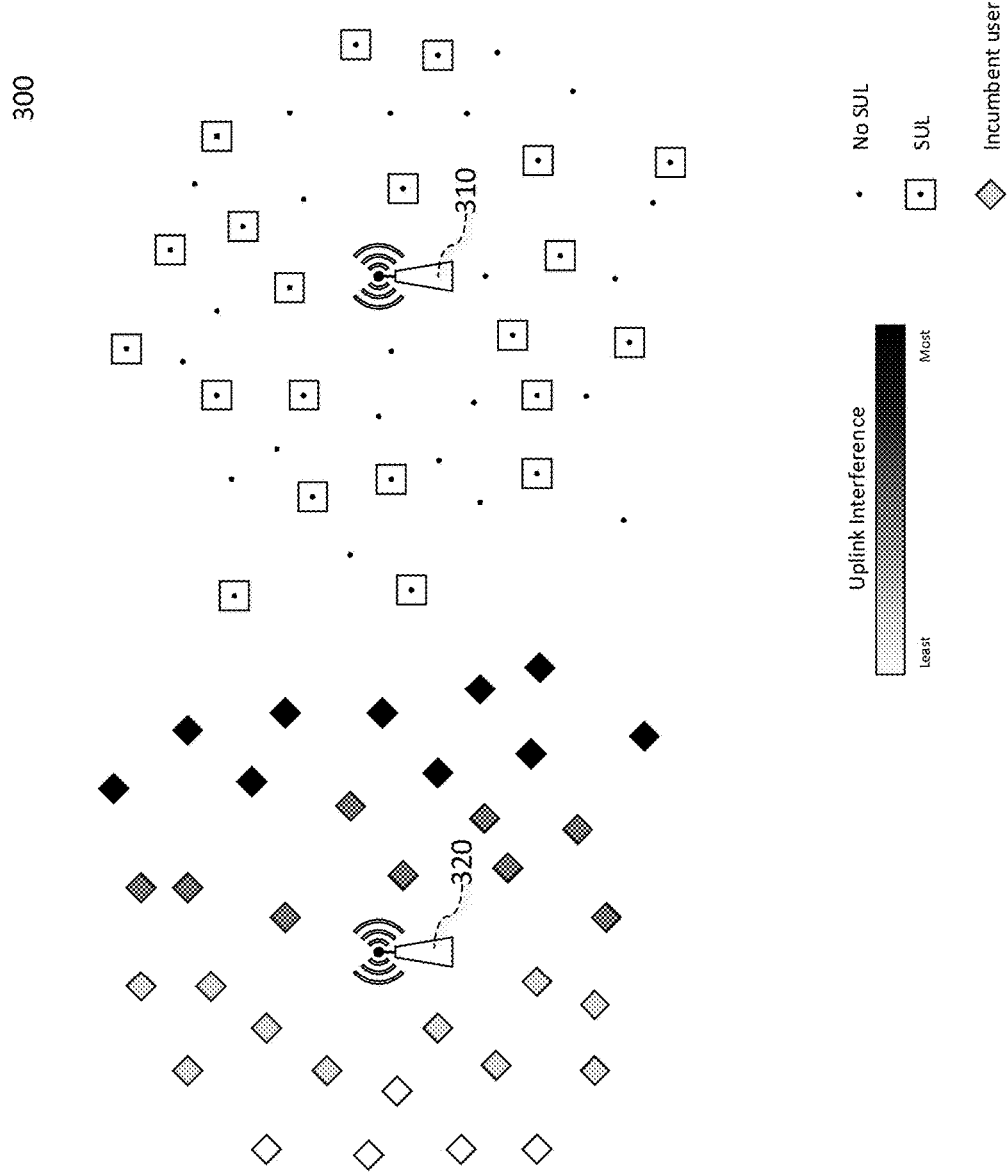
FIG. 3 shows a first network scenario for a spectrum sharing system.

FIG. 3 shows an exemplary wireless network 300 composed of licensee base station 310 and incumbent base station 320. It is understood that the scenario depicted in FIG. 3 is exemplary, and may vary dependent on the particular network architectures employed by both licensee base station 310 and incumbent base station 320. Wireless network 300 may be a shared spectrum network such as an SAS or LSA network. As noted above, wireless network 300 may alternatively be any wireless network in which radio activity of the licensee interferes with radio activity of the incumbent.

Figure 4:
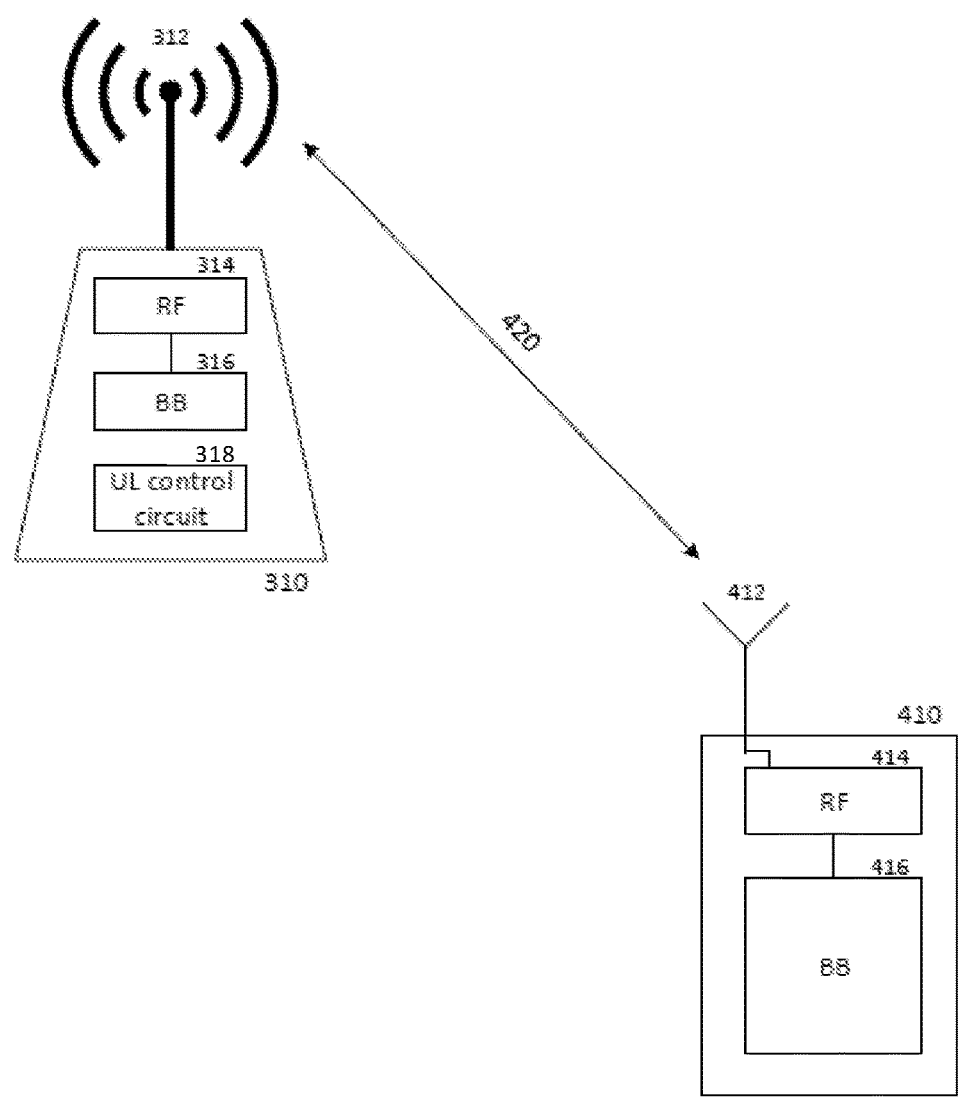
FIG. 4 shows an internal configuration of a licensee base station and a licensee user terminal.

FIG. 4 shows a block diagram illustrating the various components of licensee base station 310 and licensee user terminal 400. As shown in FIG. 4, licensee base station 310 may include antenna system 312, radio processing circuit 314, baseband processing circuit 316, and uplink control circuit 318. Licensee base station 310 may receive wireless radio frequency signals with antenna system 312, which may each be a single antenna or an antenna array composed of multiple antennas. Antenna system 312 may transduce received wireless radio frequency signals into electrical radio frequency signals and provide resulting electrical radio frequency signals to radio processing circuit 314.

Radio processing circuit 314 may be configured as a Remote Radio Unit (RRU) in a base station context, and thus may be configured to transmit and receive wireless signals. Radio processing circuit 314 may include various reception circuitry components, which may include analog circuitry configured to process electrical radio frequency signals such as e.g. mixing circuitry to convert received electrical radio frequency signals to baseband and/or intermediate frequencies. Radio processing circuit 314 may also include amplification circuitry to amplify received electrical radio frequency signals, such as power amplifiers (PAs) and/or Low Noise Amplifiers (LNAs). Radio processing circuit 314 may additionally include various transmission circuitry components configured to transmit internally received signals, such as e.g. baseband and/or intermediate frequency signals provided by baseband processing circuit 316, which may include mixing circuitry to modulate internally received signals onto one or more radio frequency carrier waves and/or amplification circuitry to amplify internally received signals before transmission. Radio processing circuit 314 may provide such signals to antenna system 312 for wireless transmission.

Baseband processing circuit 316 may be configured as a Baseband Unit (BBU) in a base station context, and may be responsible for controlling radio communications according to a wireless communication protocol, e.g. LTE, UMTS, LTE, CDMA, etc. Baseband processing circuit 316 may be a processing circuit such as a Central Processing Unit (CPU), microprocessor (i.e. a single chip implementation of a CPU), or a microcontroller (i.e. a single chip implementation of a CPU, memory (e.g. ROM or RAM), and other peripherals) configured to execute program code that defines arithmetic, logical, control and input/output (I/O) processor operations. Baseband processing circuit 316 may be configured to control operation of radio processing circuit 314 and antenna system 312 in accordance with a wireless communication protocol stack by executing program code of software and/or firmware modules of a wireless communication protocol stack. Although not explicitly depicted in FIG. 3, baseband processing circuit 316 may include one or more memory components. Baseband processing circuit 316 may retrieve the corresponding program code from the one or more provided memory components and execute the program code of the software and/or firmware modules to control radio processing circuit 314 in accordance with control logic provided by various layers of the wireless communication protocol stack, which may include controlling physical (PHY) layer circuitry included as part of baseband processing circuit 316 in order to transmit and receive wireless communication signals with radio processing circuit 314 and antenna system 312. Further references herein to reception and/or transmission of wireless signals and other processing operations by licensee base station 310 may thus be understood as an interaction between antenna system 312, radio processing circuit 314, and baseband processing circuit 316 as detailed above.

Uplink control circuit 318 may be configured to manage uplink transmissions by licensee user terminals served by licensee base station 310, and accordingly may be configured to interact with baseband processing circuit 310 in order to communicate with licensee user terminals via control signaling in order to both allocate uplink transmission resources. Uplink control circuit 318 may be a processing circuit such as a CPU, microprocessor (i.e. a single chip implementation of a CPU), or a microcontroller (i.e. a single chip implementation of a CPU, memory (e.g. ROM or RAM), and other peripherals) configured to execute program code that defines arithmetic, logical, control and input/output (I/O) processor operations. Uplink control circuit 318 may be configured to control uplink communications according to a wireless communication protocol, e.g. LTE, UMTS, LTE, CDMA, etc., and accordingly may be configured to control operation of.

Although not explicitly depicted in FIG. 3, uplink control circuit 318 may include one or more memory components. Uplink control circuit 318 may retrieve the corresponding program code from the one or more provided memory components and execute the program code of the software and/or firmware modules to control perform uplink transmission control procedures in accordance with control logic provided by various layers of the wireless communication protocol stack, which may include evaluating radio measurements, selecting licensee user terminals for certain roles, allocating uplink transmission resources to licensee user terminals (for both shared spectrum and licensed dedicated spectrum), instructing baseband processing circuit 316 to provide control signaling to licensee user terminals, etc. The functionality of uplink control circuit 318 detailed herein may be embodied as computer-readable instructions or code and stored in a non-transitory computer-readable storage medium for execution by uplink control circuit 318. Uplink control circuit 318 may be included as a component of baseband processing circuit 316 (e.g. in a BBU), as a component of radio processing circuit 312 (e.g. in an RRU), separately within licensee base station 310, as part of the core network connected to licensee base station 310, or as a radio access network entity connected to multiple licensee base stations.

As will be further detailed, in a first aspect of the disclosure uplink control circuit 318 may be a network control circuit configured to manage radio communications for a first wireless network (the licensee network), and may be further configured to estimate a proximity to a second wireless network for each of a plurality of user terminals based on a measurement of the second wireless network reported by each of the plurality of user terminals, select one or more measurement terminals from the plurality of user terminals based on the estimated proximity of each of the plurality of user terminals, and receive one or more interference measurements from the one or more measurement terminals that indicate interference to the second wireless network caused by the first wireless network. In a second aspect of the disclosure, uplink control circuit 318 may be a network control circuit configured to manage radio communications for a first wireless network (the licensee network), and may be further configured to estimate a proximity to a second wireless network for each of a plurality of user terminals based on a measurement of the second wireless network reported by each of the plurality of user terminals, determine whether the second wireless network is experiencing excessive interference from the first wireless network, and if the second wireless network is experiencing excessive interference from the first wireless network, adjust a transmit power allocation of one or more selected user terminals of the plurality of user terminals based on the estimated proximity to the second wireless network for each of the one or more selected user terminals.

Accordingly, licensee base station 310 may additionally be connected with a core network, and accordingly may act as an interface between the radio access network portion and the core network portion of the licensee communication network.

Licensee user terminal 410 may be configured as a counterpart device to licensee base station 310. As shown in FIG. 4, licensee user terminal 410 may include antenna system 412, radio processing circuit 414, and baseband processing circuit 416. Licensee base station 410 may receive wireless radio frequency signals with antenna system 412, which may each be a single antenna or an antenna array composed of multiple antennas. Antenna system 412 may transduce received wireless radio frequency signals into electrical radio frequency signals and provide resulting electrical radio frequency signals to radio processing circuit 414.

Radio processing circuit 414 may be configured as a mobile terminal radio frequency (RF) transceiver, and thus may be configured to transmit and receive wireless signals. Radio processing circuit 414 may include various reception circuitry components, which may include analog circuitry configured to process electrical radio frequency signals such as e.g. mixing circuitry to convert received electrical radio frequency signals to baseband and/or intermediate frequencies. Radio processing circuit 414 may also include amplification circuitry to amplify received electrical radio frequency signals, such as power amplifiers (PAs) and/or Low Noise Amplifiers (LNAs). Radio processing circuit 414 may additionally include various transmission circuitry components configured to transmit internally received signals, such as e.g. baseband and/or intermediate frequency signals provided by baseband processing circuit 416, which may include mixing circuitry to modulate internally received signals onto one or more radio frequency carrier waves and/or amplification circuitry to amplify internally received signals before transmission. Radio processing circuit 414 may provide such signals to antenna system 412 for wireless transmission.

Baseband processing circuit 416 may be configured as a baseband modem, and may be responsible for controlling radio communications according to a wireless communication protocol, e.g. LTE, UMTS, LTE, CDMA, etc. Baseband processing circuit 416 may be a Central Processing Unit (CPU) such as a microprocessor (i.e. a single chip implementation of a CPU) or a microcontroller (i.e. a single chip implementation of a CPU, memory (e.g. ROM or RAM), and other peripherals) configured to execute program code that defines instructions for arithmetic, logical, control and input/output (I/O) processor operations. Baseband processing circuit 416 may be configured to control operation of radio processing circuit 414 and antenna system 412 in accordance with a wireless communication protocol stack by executing program code of software and/or firmware modules of a wireless communication protocol stack. Although not explicitly depicted in FIG. 3, baseband processing circuit 416 may include one or more memory components. Baseband processing circuit 416 may retrieve the corresponding program code from the one or more provided memory components and execute the program code of the software and/or firmware modules to control and radio processing circuit 414 in accordance with control logic provided by various layers of the wireless communication protocol stack, such as Layer 3, Layer 2, and Layer 1 (PHY layer) control logic, which may include controlling PHY layer circuitry included in baseband processing circuit 416 in order to transmit and receive wireless communication signals with radio processing circuit 414 and antenna system 412. The functionality of baseband processing circuit 416 detailed herein may be embodied as computer-readable instructions or code and stored in a non-transitory computer-readable storage medium for execution by baseband processing circuit 416. Further references herein to reception and/or transmission of wireless signals and other processing operations by licensee user terminal 410 may thus be understood as an interaction between antenna system 412, radio processing circuit 414, and baseband processing circuit 416 as detailed above.

As will be detailed, licensee user terminal 410 may be a mobile terminal comprising a radio processing circuit (radio processing circuit 414) and a baseband processing circuit (baseband processing circuit 414) configured to interact with the radio processing circuit to transmit and receive radio signals, where the baseband processing circuit is further configured to receive a composite signal including a first received signal from a first wireless network and a second received signal from a second wireless network, calculate a correlation between the composite signal and a local reference signal to determine a signal power measurement of the second received signal, report the signal power measurement to the first wireless network as a measurement report, and receive control signaling in response to the measurement report that specifies an assigned operation configuration for the user terminal.

Licensee base station 310 may be configured to communicate with licensee user terminal 410 over wireless channel 420, where the communication connection may be controlled by baseband processing circuits 316 and 416 according to a particular radio access technology protocol. As depicted in FIG. 3, licensee base station 310 may communicate with multiple licensee user terminals, which may configured equivalently to licensee user terminal 410.

Incumbent base station 320 may operate a wireless network on spectrum that is licensed by an incumbent operator. Licensee base station 310 may correspond to an MNO or other licensee that licenses the shared spectrum from the incumbent operator according to a spectrum sharing system, which may include licensing the shared spectrum on a time- and geographic-dependent basis. Incumbent base station 320 may serve a corresponding incumbent cell (not explicitly depicted in FIG. 3) while licensee base station 310 may serve a corresponding licensee cell (not explicitly depicted in FIG). Each of incumbent base station 320 and licensee base station 310 may each serve one or more users located within the respective incumbent and licensee cells.

The licensee may thus operate a mobile communication network such as an LTE network using the shared spectrum. Although not limited to such, the licensee may utilize the available shared spectrum in a supplemental role, such as by allowing mobile terminals to utilize the shared spectrum for SUL or SDL purposes. Accordingly, licensee base station 310 (or another proximate base station of the licensee operator) may additionally operate a separate mobile communication network on dedicated spectrum that is exclusively licensed to the licensee operator. Accordingly, licensee user terminals served by licensee base station 310 may utilize both licensed spectrum in a primary role in addition to the shared spectrum in a secondary or supplemental role.

As previously detailed, spectrum sharing systems may designate certain geographic areas in which licensee operation is restricted (which may also be time-dependent restrictions). Accordingly, the area surrounding incumbent base station 320 may be designated as an exclusion zone (which may include and even extend past the incumbent cell boundaries) where the licensee operator is not allowed to actively operate radio transmitters on shared spectrum. Downlink transmissions by licensee base station 310 may not cause substantial interference due to the distance relative to the incumbent cell; however, licensee base station 310 may thus need to ensure that licensee user terminals do not perform uplink transmissions on shared spectrum within the exclusion zone. It is again noted that while uplink transmissions on shared spectrum may be prohibited (e.g. SUL), licensee user terminals may be free to perform uplink transmissions on licensed spectrum.

Licensee base station 310 may be located within a protection zone or another similar interference restriction zone, where incumbent receivers will not be subject to harmful interference caused by licensee transmissions on shared spectrum. While downlink transmissions by licensee base station 310 may not be significantly problematic, excessive uplink transmissions by licensee user terminals, in particular licensee user terminals located proximate to the incumbent cell, may result in excessive interference to incumbent users. Accordingly, licensee base station 310 (specifically uplink control circuit 318) may be responsible for managing uplink licensee user terminal activity in order to ensure that incumbent base station 320 and the corresponding incumbent users are protected.

As previously indicated, it may be important for licensee base station 310 to consider at least two factors in order to ensure protection of incumbent users with respect to licensee activity in protection zones: accurate estimation of interference to the incumbent and appropriate power control measures for licensee activity if excessive interference is detected.

Regarding power control measures for licensee activity, licensee base station 310 may permit certain licensee user terminals to utilize the shared spectrum for uplink transmission. However, licensee activity may substantially interfere with incumbent operation if licensee base station 310 does not carefully consider both which licensee user terminals are allowed to utilize shared spectrum for uplink and the uplink transmission power utilized by such licensee user terminals.

In the exemplary scenario of FIG. 3, licensee base station 310 may allow a random or "arbitrary" selection of licensee user terminals to utilize the shared spectrum for uplink, which may result in a wide distribution of licensee shared spectrum uplink user terminals across the licensee cell and protection zone. Additionally and/or alternatively, licensee base station 310 may allow each licensee user terminal that wishes to transmit uplink data (e.g. by requesting uplink resources from licensee base station 310 via control signaling) to utilize shared spectrum, which may potentially also result in a "random" distribution of licensee terminals utilizing shared spectrum for uplink. Such licensee shared spectrum uplink user terminals may optionally utilize the shared spectrum for downlink in addition to uplink, or alternatively may solely utilize dedicated licensed spectrum for downlink.

However, as a result of the random selection of licensee shared spectrum uplink user terminals, some of the licensee shared spectrum uplink user terminals may be located closer to the incumbent cell (and exclusion zone) than other licensee shared spectrum uplink user terminals, and may even be located within the exclusion zone. Such close proximity to the incumbent cell may result in substantial interference to incumbent operation. As denoted by the uplink interference shading in FIG. 3, incumbent receivers located closest to the licensee cell (and consequently located closest to licensee shared spectrum uplink user terminals) may suffer from significant interference as a result of the licensee shared spectrum uplink activity. While the interference experienced by incumbent receivers as a result of licensee activity on shared spectrum may decrease proportionally to the distance from the licensee shared spectrum uplink user terminals, the interference to the incumbent cell may be sufficient to disrupt incumbent activity (which licensee base station 310 may detect via user measurement, as will be later detailed). Accordingly, the interference to incumbent receivers caused by the random selection of licensee shared spectrum uplink user terminals may fail to meet the protection levels defined for protection zone shared spectrum operation, and accordingly licensee base station 310 may need to enact power control measures in order to reduce the interference level to appropriate levels. Licensee base station 310 may thus choose to reduce the number of licensee shared spectrum uplink user terminals (e.g. by terminating shared spectrum uplink activity for one or more licensee shared spectrum uplink user terminals), reduce the permitted shared spectrum uplink transmit power for some or all licensee shared spectrum uplink user terminals, or other similar power control measures, in order to reduce the interference seen by the incumbent users.

However, arbitrary or uniform selection of shared spectrum uplink user terminals to prohibit or limit from using shared spectrum for uplink may not be particularly effective. As shown in FIG. 3, arbitrary or uniform power control measures may inadvertently disable or reduce shared spectrum uplink operation for licensee user terminals that are located far from the incumbent cell, which may only have a minimal effect on the interference experienced by the incumbent. Additionally, licensee base station 310 may inadvertently allow licensee user terminals located close to the incumbent cell to continue using shared spectrum for uplink transmissions, which may continue to contribute excessive interference to the incumbent.

As opposed to arbitrary or uniform restriction of shared spectrum uplink activity, licensee base station 310 may instead intuitively select which licensee user terminals to assign for shared spectrum uplink operation based on the estimated location of licensee user terminals relative to the incumbent cell. Licensee base station 310 may thus choose to perform uplink power control measures based on which licensee user terminals are closest and furthest from the incumbent cell, and thus may select which licensee user terminals to allow to utilize shared spectrum uplink and select appropriate shared spectrum uplink transmit powers for such licensee user terminals accordingly.

Specifically, licensee base station 310 may, i.e. at uplink control circuit 318, analyze radio measurements provided by the licensee user terminals in order to identify which licensee user terminals are located closest to and which licensee user terminals are located furthest from the incumbent cell. Uplink control circuit 318 may then select licensee user terminals that are located closest to the incumbent cell to utilize as measurement terminals, which may then perform radio measurements to report to licensee base station 310 that indicate the level of interference to the incumbent caused by uplink licensee radio activity. Uplink control circuit 318 may then determine if uplink power control measures are warranted based on the interference estimations, and, if so, may subsequently apply the previously obtained information about proximity to the incumbent cell in order to decide appropriate power control measures. For example, uplink control circuit 318 may restrict or reduce uplink activity on shared spectrum for licensee user terminals located closest to the incumbent cell and permit or only marginally reduce uplink activity for licensee user terminals located furthest from the incumbent cell.

Figure 5:
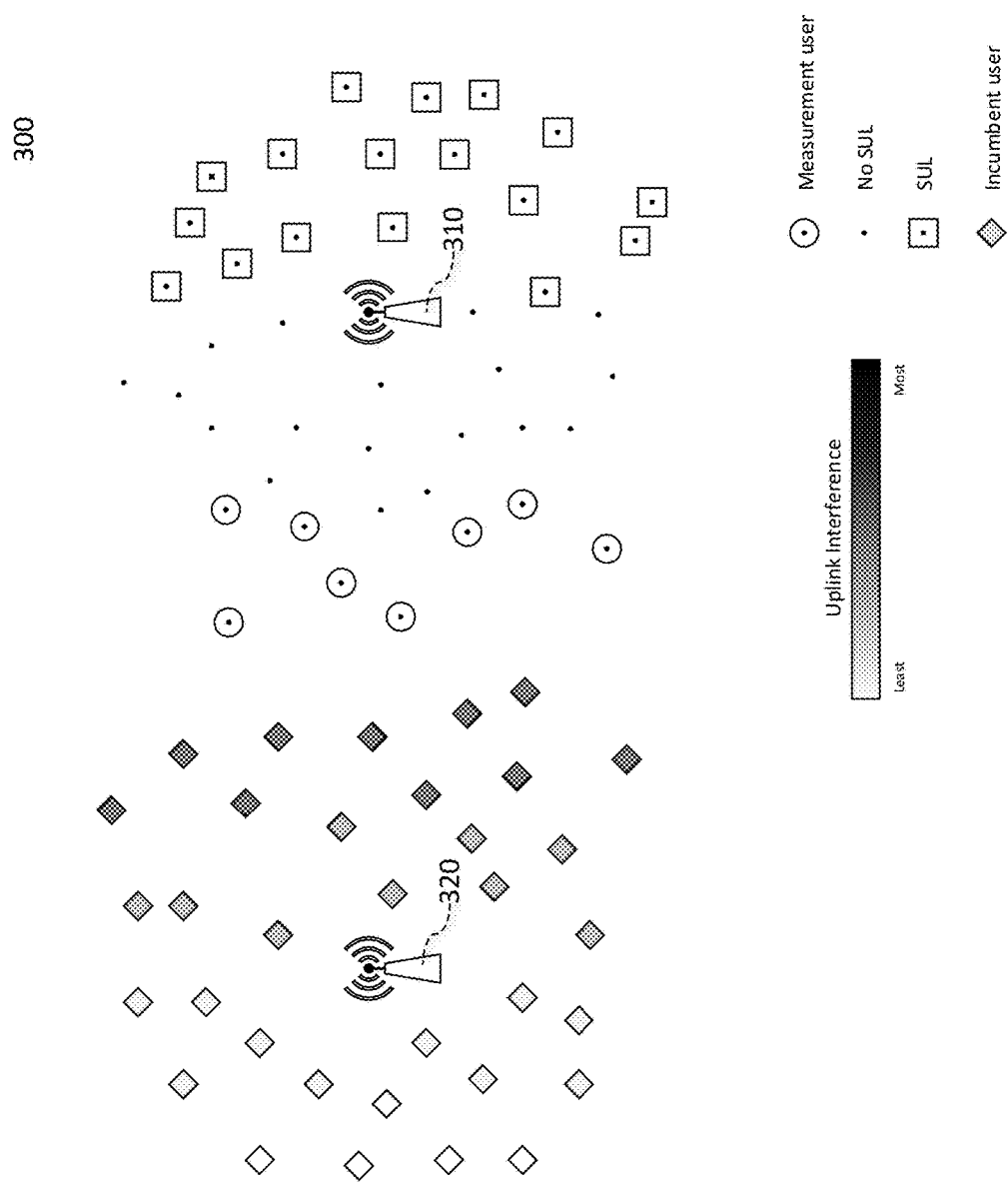
FIG. 5 shows a second network scenario for a spectrum sharing system.

FIG. 5 shows an exemplary result of such an uplink interference management procedure performed by licensee base station 310 at uplink control circuit 318. As shown in FIG. 5, uplink control circuit 318 may authorize licensee user terminals located furthest from the incumbent cell to utilize shared spectrum for uplink while denying shared spectrum uplink usage to licensee user terminals located closest to the incumbent cell. The interference experienced by the incumbent may thus be reduced as depicted by the exemplary interference shading for incumbent users. As will be later detailed, uplink control circuit 318 may additionally select licensee user terminals that are located closest to the incumbent cell as measurement terminals, which may report uplink interference estimations to uplink control circuit 318 for use in applying uplink shared spectrum power control.

Uplink control circuit 318 may thus need to characterize the distance between each licensee user terminal and the incumbent cell. Accordingly, uplink control circuit 318 may employ a "ranking" scheme based on signal power measurements of incumbent signals obtained by the licensee user terminals. For example, uplink control circuit 318 may obtain incumbent signal power estimates from each licensee user terminal and rank the licensee user terminals based thereon to obtain an incumbent cell proximity ranking, where uplink control circuit 318 may characterize licensee user terminals that report the strongest incumbent signal power estimates as being located closest to the incumbent cell and conversely characterizes licensee user terminals that report the weakest incumbent signal power estimates as being located furthest from the incumbent cell. Uplink control circuit 318 may then utilize the incumbent signal power ranking to select measurement terminals (located closest to the incumbent cell) and perform uplink shared spectrum power control.

Uplink control circuit 318 may have several options for obtaining the incumbent power measurements in order to characterize licensee user terminal distance from the incumbent cell. In a first approach, uplink control circuit 318 may rely on incumbent silence periods, which may need to be specifically configured as part of incumbent operation. In such incumbent silence periods, incumbent transmitters may be configured to cease transmission, thus resulting in a "silence" time period in which no incumbent transmitters are active. Uplink control circuit 318 may then instruct licensee user terminals via control signaling to perform radio measurements during these incumbent silence periods in addition to performing further radio measurements during standard incumbent operation periods, i.e. when incumbent base stations and incumbent users are active. The licensee user terminals may then report the obtained silence and non-silence radio measurements back to uplink control circuit 318.

Under the assumption of constant noise and incumbent signal power, uplink control circuit 318 may identify which licensee user terminals are closest to the incumbent cell by evaluating the difference in non-silence and silence period signal power measurements supplied by each licensee user terminal, where uplink control circuit 318 may identify licensee user terminals with the largest difference between non-silence and silence period measurements as being closest to the incumbent cell (due to high incumbent signal power measurements) and licensee user terminals with the smallest difference between non-silence and silence period measurements as being furthest from the incumbent cell. Uplink control circuit 318 may then rank the licensee user terminals based on the estimated distance (or equivalently based on non-silence to silence difference). However, incumbent silence periods may need to be incorporated into incumbent operational behavior (which may or may not be feasible), and additionally may limit incumbent operating times due to the system downtime required for such silence periods.

Instead, in a second approach, the licensee user terminals may obtain incumbent signal power estimates by using downlink reference signal measurements to isolate the incumbent signal power from received downlink signals. By isolating the incumbent signal power from received downlink signals, the licensee user terminals may obtain an accurate estimation of incumbent signal power (without the need for incumbent silence periods). The licensee user terminals may then provide the incumbent signal power estimates to uplink control circuit 318, which may evaluate the incumbent signal power estimates to perform uplink power control procedures (if necessary)

Specifically, a licensee user terminal such as licensee user terminal 410 may estimate the received signal power of a downlink reference signal and subtract the estimated downlink reference signal power from a downlink signal power measurement. By exploiting properties of certain downlink reference signals and assuming constant noise, licensee user terminal 410 may isolate the incumbent signal power from the downlink signal power measurement, thus obtaining a measurement for uplink control circuit 318 to apply in order to identify incumbent-proximate and incumbent-distant users.

Figure 6:
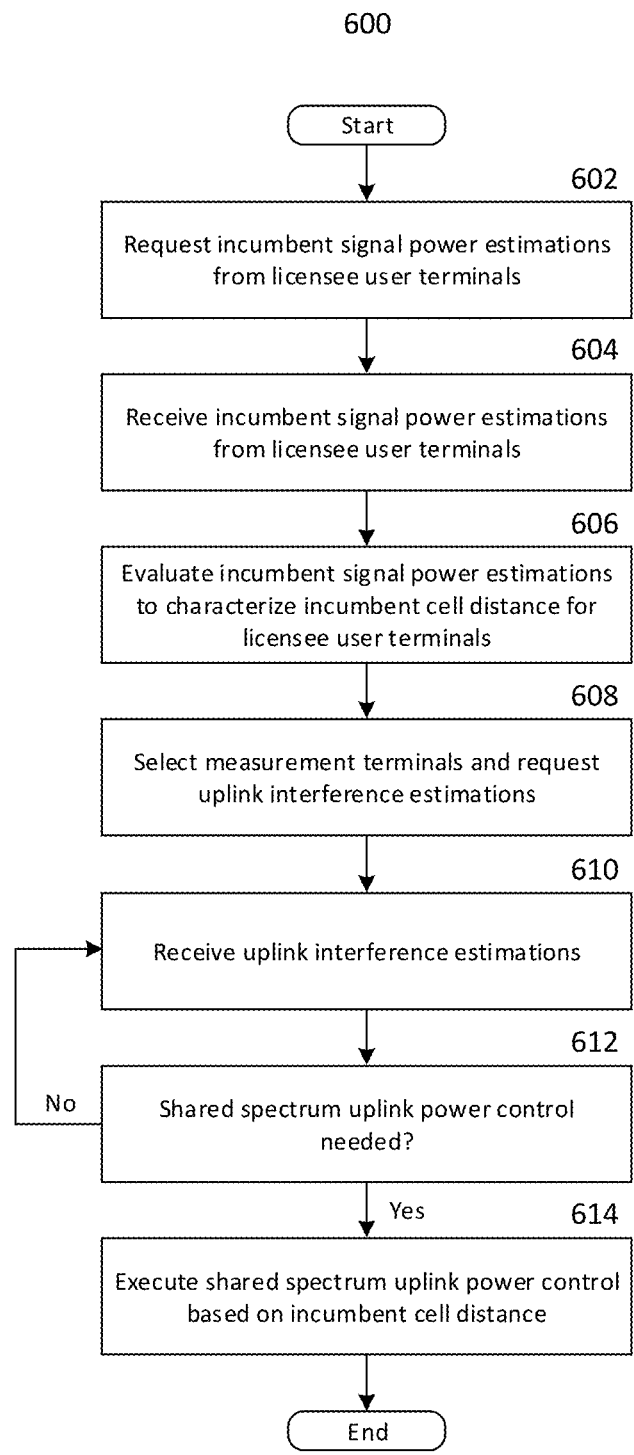
FIG. 6 shows a method for selecting measurement terminals and performing uplink power control.

FIG. 6 shows method 600 for performing uplink power control. Licensee base station 310 may execute method 600, such as at uplink control circuit 318 via radio processing circuit 314 and antenna system 312 for receiving and transmitting operations. Uplink control circuit 318 may execute method 600 as a component of the licensee network (such as at an LSA entity contained within the licensee network) or as a component outside of the licensee network (such as an SAS entity located outside of the licensee network). Alternatively, uplink control circuit 318 may be distributed partially inside and partially outside of the licensee network, such as an SAS component split into two parts as an intra-network-domain SAS component and an extra-network-domain SAS, and accordingly may execute method 600 partially in the intra-network domain SAS and in the extra-network-domain SAS.

Uplink control circuit 318 may first request incumbent signal power estimations from licensee user terminals in 610, during which uplink control circuit 318 may transmit (via baseband processing circuit 316, radio processing circuit 314, and antenna system 312) control signaling to the licensee user terminals that requests incumbent signal power estimates. Uplink control circuit 318 may either request incumbent signal power estimations for a single-instance (i.e. one-time), periodically, or autonomously (i.e. allowing the licensee user terminals to provide incumbent signal power estimates autonomously). Uplink control circuit 318 may then receive (via baseband processing circuit 316, radio processing circuit 314, and antenna system 312) incumbent signal power estimates from the licensee user terminals in 604 (where the incumbent signal power estimation procedure will be later detailed) as measurement reports and proceed to evaluate the incumbent signal power estimates in 606. As previously indicated, uplink control circuit 318 may characterize the incumbent cell distance for each licensee user terminal based on the reported incumbent signal power estimates in 606, such as by ranking the licensee user terminals based on reported incumbent signal power estimates. Uplink control circuit 318 may rank licensee user terminals that report the strongest incumbent signal power estimates as being closest to the incumbent cell and licensee user terminals that report the weakest incumbent signal power estimates as being furthest from the incumbent cell. Uplink control circuit 318 may utilize any of a number of alternative ranking criteria, such as according to Bit Error Rate (BER)/Packet Error Rate (PER), Signal (plus-Interference)-to-Noise Ratio (SNR), call drop rates, etc.

Alternatively to utilizing incumbent signal power estimates to characterize the incumbent cell distance for licensee user terminals, uplink control circuit 318 may utilize other mobile terminal location mechanisms such as Global Positioning Systems (GPS), Observed Time Difference of Arrival (OTDOA) positioning, etc., in order to identify the location of each licensee user terminal. However, such may have limited effectiveness as uplink control circuit 318 may not have exact knowledge of the location of the incumbent cell, and accordingly may not be able to rely on absolute user terminal positioning information to determine the proximity of each licensee user terminal to the incumbent cell. Regardless it is appreciated that alternative licensee user positioning mechanisms may be similarly employed. Uplink control circuit 318 may utilize the incumbent cell distance to both select suitable measurement terminals for reporting uplink interference estimates and, if needed, for selecting licensee user terminals to restrict or limit during shared spectrum uplink power control.

Accordingly, uplink control circuit 318 may in 608 select one or more measurement terminals from the licensee user terminals based on the incumbent cell distance for the licensee user terminals obtained in 606. For example, uplink control circuit 318 may e.g. select a predefined quantity of the licensee user terminals that report the strongest incumbent signal power estimates as the measurement terminals or may e.g. select all licensee user terminals that report incumbent signal power estimates that satisfy predefined criteria (e.g. a threshold) as the measurement terminals. Uplink control circuit 318 may then assign the selected licensee user terminals as measurement terminals and request uplink interference estimations from the measurement terminals via control signaling in 608. After requesting uplink interference estimates, uplink control circuit 318 may receive the uplink interference estimates from the measurement terminals as measurement reports in 610. Uplink control circuit 318 may then analyze the reported uplink interference measurements to determine whether shared spectrum uplink power control is needed in 612.

As previously indicated, uplink control circuit 318 may need to manage interference to the incumbent caused by uplink shared spectrum activity to keep such uplink interference within acceptable levels, such as by managing uplink radio activity on shared spectrum to ensure that uplink interference remains below a predetermined threshold (e.g. a protection zone uplink interference threshold). Accordingly, uplink control circuit 318 may evaluate the reported uplink interference estimates in 612 to determine if the current levels of uplink interference indicated by the reported uplink interference estimates are within acceptable levels and, if not, engage in power control for uplink transmissions on the shared spectrum.

As uplink control circuit 318 may select the licensee user terminals closest to the incumbent cell (on the basis of received incumbent signal power) as the measurement terminals (as shown in FIG. 5), the measurement terminals may provide accurate interference level measurements. Uplink control circuit 318 may aggregate the reported uplink interference estimations, such as by computing an average, selecting a median, etc., to determine an accurate uplink interference measurement from the reported uplink interference measurements. Uplink control circuit 318 may then compare the aggregated uplink interference measurement to predefined criteria, such as predefined uplink interference threshold, to determine whether uplink power control measures are necessary.

As shown in FIG. 5, the measurement terminals may not actually be located in the incumbent cell (although such is nevertheless possible), and accordingly incumbent receivers may see greater interference than indicated by the "raw" (i.e. unadjusted) uplink interference estimations reported by the measurement terminals. As the incumbent cell is located further from the interfering licensee user terminals than the measurement terminals, the measurement terminals may consistently report higher uplink interference estimates than actually experienced by incumbent receivers. Accordingly, uplink control circuit 318 may select appropriate interference level criteria to utilize for comparison with the "raw" uplink interference estimations reported by the measurement terminals, such as by using an uplink interference threshold that is higher than the actual uplink interference threshold desired for the incumbent cell. Furthermore, as some measurement terminals are located closer to the incumbent cell than others, uplink control circuit 318 may perform a weighted aggregation, such as by weighting each reported uplink interference estimation based on the estimated incumbent signal power reported by each measurement terminal, i.e. with the most incumbent-proximate measurement terminals (highest reported estimated incumbent signal power measurement) having greater weight than the least incumbent-proximate measurement terminals.

Alternatively to utilizing uplink interference estimations based on uplink interference measurements obtained by the measurement terminals, uplink control circuit 318 may instead be configured to estimate the uplink interference, such as based on licensee user terminal locations (as indicated by reported incumbent signal power estimates, GPS, OTDOA, or other mobile terminal positioning mechanisms). For example, uplink control circuit 318 may be able to perform an interference estimation simulation that considers the uplink transmit power allocated to each licensee user terminal and the location of each licensee user terminal (either absolute location or relative distance to the incumbent). Accordingly, uplink control circuit 318 may be able to calculate an estimated interference contribution by each licensee user terminal based on the uplink transmit power and location, and calculate the cumulative interference to the uplink by aggregating the estimated interference contributions by each licensee user terminal. Such may allow for power saving at licensee user terminals (due to the absence of uplink interference calculations) but may be prone to greater estimation errors depending on the accuracy of the estimation calculation employed by uplink control circuit 318.

The interference measurements obtained at uplink control circuit 318 may relate to a neighboring signal power that affects transmission of a concerned signal of uplink control circuit 318. The neighboring signal power associated with the interference measurements may occur sporadically, continuously, continuously with some interruptions, etc. The level of interference may also vary over time, e.g. the interference level may occasionally increase and subsequently decrease and/or vice versa. The interference can also relate to in-band interference or blocking effects or out-of-band/spurious emission or any unwanted emissions effects of a certain system affecting a neighboring system (e.g. due to insufficient filtering of unwanted emissions in the concerned network equipment). Uplink control circuit 318 may thus apply method 600 to reduce such interference effects. Furthermore, the interference effects may only concern a subset of users in a given network/cell/etc. targeted by uplink control circuit 318. For example, directive transmissions (such as e.g. MIMO beamforming-based) may occur in the context of cmWave and mmWave transmissions (cmWave: 3-30 GHz; mmWave: 30-300 GHz). Uplink control circuit 318 may then identify the interference area (e.g. based on 2D and/or 3D transmission angle to the concerned equipment applying beamforming) and apply method 600 in the context of interference reduction/avoidance to only to the concerned devices. Typically, devices having beamforming directions pointing away from the concerned neighboring network(s) may be able to use any configuration as interference will be minimal.

Uplink control circuit 318 may thus obtain an estimated uplink interference, which may be an aggregated uplink interference estimate derived from radio measurements and/or interference simulations. Uplink control circuit 318 may thus determine if the estimated uplink interference experienced by the incumbent falls within acceptable levels or not in 612. If the estimated uplink interference does not fall within acceptable levels, uplink control circuit 318 may initiate power control for shared spectrum uplink in 614.

Uplink control circuit 318 may utilize instantaneous uplink interference measurements in 612 and 614 (and subsequently re-evaluate updated interference measurements if the interference measurements change), average interference measurements calculated as an average over a predefined period of time, maximum (or e.g. average or minimum) interference measurements obtained over a predefined period of time, or any other statistical and/or deterministic interference measurement.

Uplink control circuit 318 may utilize the incumbent cell distance characterization determined in 606 in order to perform uplink power control. As shown in FIG. 5, certain licensee user terminals may be located close to the incumbent cell (which may have been selected as measurement terminals in 608) while other licensee user terminals may be located distant from the incumbent cell. Licensee user terminals proximate to the incumbent cell may contribute far more interference to incumbent receivers than licensee user terminals distant from the incumbent cell, and uplink control circuit 318 may thus efficiently reduce uplink interference by either prohibiting the proximate licensee user terminals from using shared spectrum for uplink or by assigning the proximate licensee user terminals relatively low uplink transmit powers.

Accordingly, uplink control circuit 318 may consider incumbent cell distance during shared spectrum uplink power control procedures. Specifically, uplink control circuit 318 may weight uplink power control procedures towards restricting or limiting licensee user terminals that are located closest to the incumbent cell, such as introduced regarding FIG. 5. Uplink control circuit 318 may allow only certain licensee user terminals to utilize shared spectrum for uplink and/or may assign specific shared spectrum uplink transmit powers for certain licensee user terminals.

For example, if uplink control circuit 318 determines in 612 that shared spectrum uplink power control is needed, uplink control circuit 318 may rank the licensee user terminals in order according to reported incumbent signal power estimate (received in 604) and subsequently select a certain number of licensee user terminals to authorize for shared spectrum uplink while prohibiting the remaining licensee user terminals from utilizing shared spectrum for uplink. It is noted that the remaining licensee user terminals may still be permitted to utilize the shared spectrum for downlink, and additionally may be able to utilize standard licensed spectrum for both uplink and/or downlink.

Alternative to either allowing or not allowing licensee user terminals to utilize shared spectrum for uplink, uplink control circuit 318 may assign varying shared spectrum uplink transmit powers to each licensee user terminal based on the incumbent signal power estimate ranking. For example, uplink control circuit 318 may assign high shared spectrum uplink transmit powers to licensee user terminals that are located furthest from the incumbent cell, and conversely assign low (or none) shared spectrum uplink transmit powers to licensee user terminals located closest to the incumbent cell. The licensee user terminals reporting the highest incumbent signal power measurements may thus be allocated the lowest SUL transmit powers or may be completely prohibited from any SUL transmissions.

Alternatively, uplink control circuit 318 may compare the incumbent signal power estimates reported by each licensee user terminal to a predetermined threshold. Uplink control circuit 318 may then permit each licensee user terminal that reports an incumbent signal power measurement below the predetermined threshold to utilize shared spectrum for uplink while prohibiting the remaining licensee user terminals that report incumbent signal power measurements above the predetermined threshold from using shared spectrum for uplink. However, such a threshold-based scheme may have increased sensitivity to noise conditions, as each licensee user terminal may report high incumbent signal power measurements in the event that the licensee cell is subject to high noise conditions (as will be detailed below regarding incumbent signal power estimates by licensee user terminals). uplink control circuit 318 may as a result unnecessarily prohibit licensee user terminals from shared spectrum uplink usage that are not substantially close to the incumbent cell due to erroneously high reported incumbent signal power estimates.

Uplink control circuit 318 may additionally consider beamforming capabilities of the licensee user terminals when executing shared spectrum uplink power control in 614. For example, one or more licensee user terminals may include sufficient antenna systems that allow the licensee user terminals to transmit directive beams, i.e. uplink beamforming. Accordingly, such licensee user terminals may be able to direct uplink transmissions to licensee base station 310, which subsequently may reduce the amount of interference caused to the incumbent. Accordingly, uplink control circuit 318 may allocate higher uplink transmit powers for such licensee user terminals than licensee user terminals that are not capable of beamforming.

Uplink control circuit 318 may additionally consider whether the shared spectrum uplink transmit power of licensee user terminals is sufficient for licensee base station 310 to receive uplink transmissions. For example, if a licensee user terminal utilizes a shared spectrum uplink transmit power that is too weak, licensee base station 310 may not be able to successfully receive uplink transmissions from the licensee user terminal. Uplink control circuit 318 may thus face scenarios where uplink control circuit 318 needs to reduce the shared spectrum uplink transmit power of a given licensee user terminal due to excessive interference, but doing so would result in insufficient shared spectrum uplink transmit power for licensee base station 310 to receive uplink transmission from the given licensee user terminal. Uplink control circuit 318 may instead allocate the given licensee user terminal to uplink transmissions on dedicated licensed spectrum instead of shared spectrum (assuming dedicated licensed spectrum is available) or may attempt to reduce the allocated shared spectrum uplink transmit power of one or more additional licensee user terminals in order to "compensate" for the excessive interference caused by the given licensee user terminal.

It is also noted that only some of the licensee user terminals may need or have requested uplink transmission resources, and accordingly not all of the licensee user terminals may need to utilize uplink in any capacity. Uplink control circuit 318 may thus not consider such licensee user terminals for uplink transmit power allocation.

After determining appropriate shared spectrum uplink power control procedures in 614, uplink control circuit 318 may transmit control signaling to each licensee user terminal that specifies a shared spectrum uplink resource allocation, i.e. whether a given licensee user terminal is permitted to use shared spectrum for uplink and, if so, an allotted shared spectrum uplink transmit power (which may be a maximum allowed shared spectrum uplink transmit power).

Uplink control circuit 318 may thus be able to obtain a shared spectrum uplink allocation similar to as shown in FIG. 5, where only certain licensee user terminals located furthest from the incumbent cell are permitted to use shared spectrum for uplink. Depending on the criteria utilized for shared spectrum uplink allocation, uplink control circuit 318 may be able to adjust the distribution of shared spectrum uplink-enabled licensee user terminals relative to the incumbent cell. For example, uplink control circuit 318 may only allow the furthest licensee user terminals to utilize shared spectrum for uplink if a "stricter" shared spectrum uplink allocation criteria is employed (i.e. only allowing a very limited number of shared spectrum uplink-enabled licensee user terminals and/or utilizing a very low reported incumbent signal power measurement threshold), while in contrast uplink control circuit 318 may allow the furthest licensee user terminals in addition to closer licensee user terminals to utilize shared spectrum uplink if a "more relaxed" shared spectrum uplink allocation criteria is employed (i.e. allowing a greater number of shared spectrum uplink-enabled licensee user terminals and/or utilizing a higher reported incumbent signal power measurement threshold).

Uplink control circuit 318 may apply a dynamic approach to shared spectrum uplink power control, and accordingly may adjust the shared spectrum uplink allocation (i.e. which licensee user terminals are allowed to transmit uplink on shared spectrum and, if so, what shared spectrum uplink transmit power such mobile terminals are permitted to use) and/or the measurement terminals over time.

As depicted in FIG. 6, uplink control circuit 318 may return to 610 if uplink control circuit 318 determines that shared spectrum uplink power control is not needed in 612. Accordingly, uplink control circuit 318 may obtain updated uplink interference estimations from the measurement terminals in 610, and again proceed to 612 in order to determine if shared spectrum uplink power control is needed based on the updated uplink interference measurements.

Similarly, as opposed to terminating method 600 following 614, uplink control circuit 318 may instead return to 610 (not explicitly mapped in FIG. 6) to re-evaluate the shared spectrum uplink interference based on updated shared spectrum uplink estimations in 612. Uplink control circuit 318 may perform such a repetition periodically in order to continuously re-evaluate the current shared spectrum uplink interference over time in order to ensure that shared spectrum uplink interference conditions remain within acceptable levels.

Additionally or alternatively, uplink control circuit 318 may return to 602 following completion of 614 (or alternatively following a negative result in 612; neither explicitly mapped in FIG. 6), and accordingly may re-evaluate updated incumbent signal power estimations reported by licensee user terminals in 602-604. Uplink control circuit 318 may then utilize the updated incumbent signal power estimations in order to obtain a new incumbent cell distance for the licensee user terminals based on the updated incumbent signal power estimations. As the licensee user terminals may be mobile, such may ensure that uplink control circuit 318 maintains an accurate characterization of the distance from the incumbent cell of each licensee user terminal.

Uplink control circuit 318 may then utilize the update incumbent cell distances for each licensee user terminal (as indicated by reported incumbent signal power estimates) in order to re-select measurement terminals and/or in order to perform shared spectrum uplink power control (if needed) in 614.

Such a dynamic approach may be advantageous as uplink control circuit 318 may be able to obtain "feedback" from the shared spectrum uplink power control performed in 614. For example, uplink control circuit 318 may select certain licensee user terminals to allow to utilize shared spectrum uplink in 614 in order to reduce shared spectrum uplink interference to the incumbent, and may subsequently obtain updated shared spectrum uplink interference estimates from the measurement terminals in 610 (after returning to 610 following 614). Accordingly, uplink control circuit 318 may be able to determine whether the initial shared spectrum uplink power control in 614 was effective in reducing shared spectrum uplink interference to within acceptable levels and, if not, perform further shared spectrum uplink power control (e.g. by allowing fewer licensee user terminals to utilize shared spectrum uplink) in 614. Uplink control circuit 318 may repeat such in a continuous process, and may use shared spectrum uplink transmit power allocations in an analogous manner.

Uplink control circuit 318 may additionally be configured to "increase" shared spectrum uplink allocations in the event that shared spectrum interference estimates indicate in 612 that the current shared spectrum uplink interference is appreciably within acceptable levels. For example, as previously detailed uplink control circuit 318 may compare an aggregated shared spectrum uplink interference estimates (obtained via shared spectrum uplink interference estimates reported by the measurement terminals in 610) to a predetermined threshold in 614 and initiate shared spectrum uplink power control if the aggregated shared spectrum uplink interference estimate exceeds the predetermined threshold. However, if the aggregated shared spectrum uplink interference estimate falls below the predetermined threshold, uplink control circuit 318 may be able to "increase" shared spectrum uplink allocation for the licensee user terminals, such as by permitting more licensee user terminals to utilize shared spectrum for uplink and/or increasing the allowed shared spectrum uplink transmit powers for licensee user terminals. Similarly to as detailed above, uplink control circuit 318 may dynamically evaluate the result of such "increases" in shared spectrum uplink allocation to determine if the shared spectrum interference level remains within acceptable levels and perform further increases in shared spectrum uplink allocation or initiate shared spectrum uplink power control measures accordingly. Uplink control circuit 318 may utilize such allowable increases in shared spectrum uplink transmit power in order to ensure that licensee user terminals have sufficient uplink transmit power to successfully transmit uplink signals to licensee base station 310.

Uplink control circuit 318 may additionally be configured to perform more aggressive shared spectrum uplink power control in 614 (and conversely more aggressive increases in shared spectrum uplink allocation) dependent on the aggregated shared spectrum uplink interference estimate. For example, if the aggregated shared spectrum uplink interference estimate exceeds a predetermined interference threshold by a substantial amount, uplink control circuit 318 may aggressively reduce the number of licensee user terminals permitted to utilize shared spectrum for uplink and/or aggressively reduce the allowed shared spectrum uplink transmit powers. Conversely, uplink control circuit 318 may only slightly reduce the number of licensee user terminals permitted to utilize shared spectrum for uplink and/or slightly reduce the allowed shared spectrum uplink transmit power if the aggregated shared spectrum uplink interference estimate exceeds a predetermined interference threshold by only a small amount.

Figure 7:
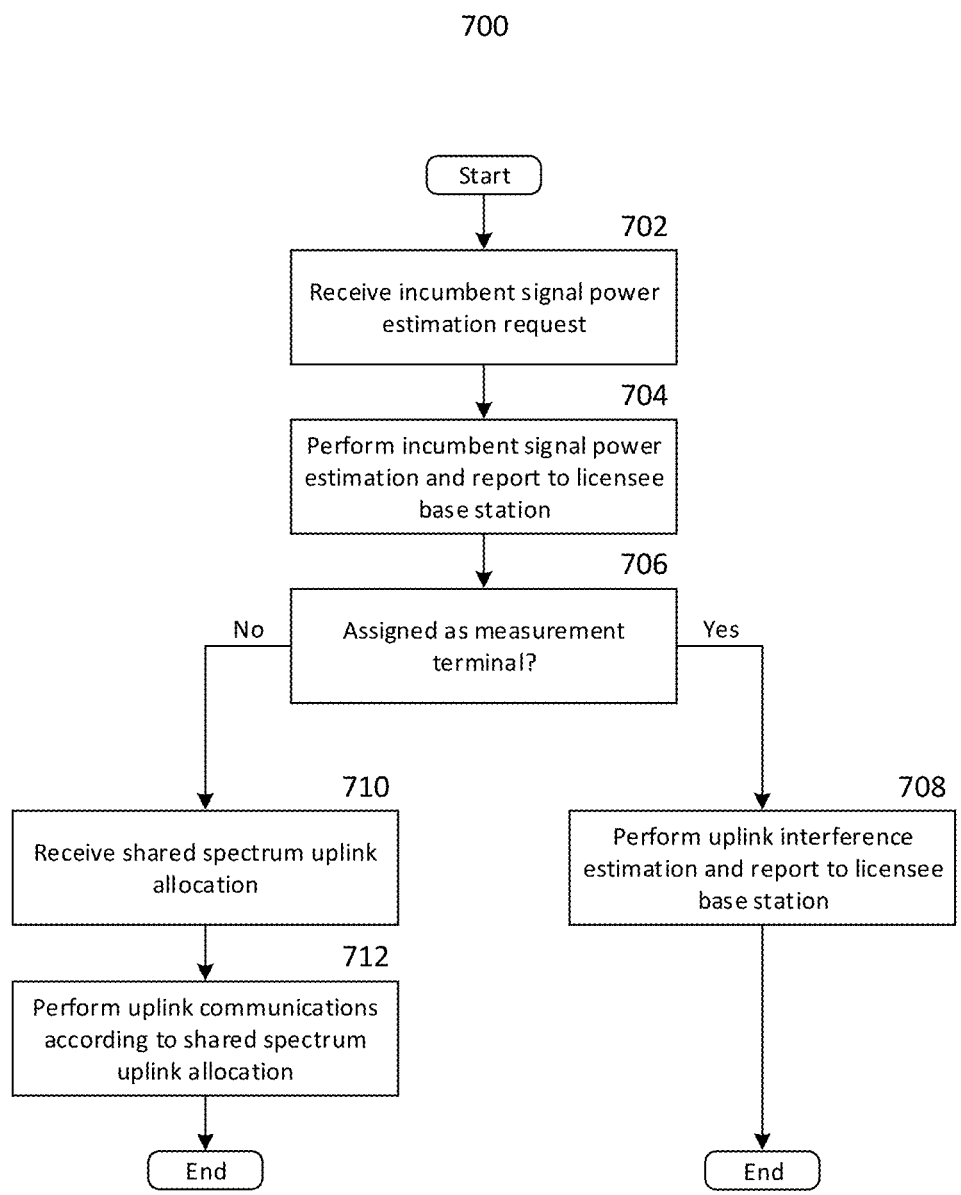
FIG. 7 shows a method for performing signal power estimates and interference measurement reporting.

FIG. 7 shows method 700, which may be performed by each licensee user terminal at a baseband processing circuit. Accordingly, a licensee user terminal such as licensee user terminal 410 may execute method 600 at baseband processing circuit 416, which may interact with radio processing circuit 414 and antenna system 412 in order to receive and transmit wireless signals.

Baseband processing circuit 416 may receive an incumbent signal power estimation request as control signaling from licensee base station 310 at 702, which may request a single-instance incumbent signal power estimate, periodic incumbent signal power estimates, or autonomous incumbent signal power estimates.

Baseband processing circuit 416 may then perform the incumbent signal power estimation and report the incumbent signal power estimate to licensee base station 310 as control signaling (e.g. a measurement report) in 704.

Baseband processing circuit 416 may utilize downlink reference signals in order to isolate the incumbent signal power from received downlink signals, thus obtaining an incumbent signal power estimate to report back to licensee base station 310. The incumbent signal power estimation and reporting procedure of 704 may be summarized as follows:

704$a$. Receive time-domain downlink signal
704$b$. Obtain frequency-domain downlink signal
704$c$. Perform downlink signal power measurement
704$d$. Calculate cross-correlation of frequency domain downlink signal with known frequency-domain downlink reference signal to obtain downlink reference signal channel response
704$e$. Calculate estimated downlink reference signal power from downlink reference signal channel response
704$f$. Subtract estimated downlink reference signal power from downlink signal power measurement to obtain estimated incumbent signal power
704$g$. Report estimated incumbent signal power to licensee base station 310

In contrast to requiring incumbent silence periods to obtain incumbent signal power estimates, licensee user terminal 410 may be able to exploit properties of downlink reference signals in order to obtain incumbent signal power estimates without adjusting incumbent operation. Specifically, various mobile communication standards may utilize downlink reference signals to periodically evaluate downlink channel quality as well as to maintain timing and frequency synchronization between a base station and user. In particular for an LTE context as specified by 3GPP, base stations may periodically transmit downlink reference signals including Primary Synchronization Signals (PSSs), Secondary Synchronization Signals (SSSs), and Cell-specific Reference Signals (CRSs), which base stations may transmit according to a certain predefined configuration (i.e. pattern) in time and frequency. Similar downlink reference signals may be provided depending on mobile communication technologies and may be utilized in an analogous manner, in particular downlink reference signals that offer high levels of independence (i.e. low correlation) from other wireless signals.

Baseband processing circuit 410 may thus receive a time-domain downlink signal $y_d(t)$ at 704$a$ during a specific reference signal reception period (i.e. symbol interval(s) containing a PSS, SSS, CRS symbol, etc.). Although any such downlink reference signal may be utilized, PSS may be of particular interest as a transmitting base station may only transmit PSS symbols during a PSS symbol interval, i.e. may not transmit any other downlink symbols other than PSS symbols (distributed over 62 central subcarrier of the LTE system bandwidth for a single symbol interval) during a PSS occasion. However, it is noted that any downlink reference signal may be analogously employed, in particular downlink reference signals that allow for separation of the downlink reference signal from other downlink signals, such as by correlation properties as will be detailed below.

Accordingly, baseband processing circuit 410 may receive downlink signal $y_d(t)$ during a PSS occasion of licensee base station 310 given as $$y_d(t)=h_{rs}(t)x_{rs}(t)+h_{inc}(t)x_{inc}(t)+n(t), \quad (1)$$

where $h_{rs}(t)$ is the impulse response of the reference signal channel (i.e. from licensee base station 310 to licensee user terminal 410), $x_{rs}(t)$ is the time-domain reference signal transmitted by licensee base station 310, $h_{inc}(t)$ is the impulse response of the channel between the incumbent cell (may be cumulative across all incumbent users and base stations in the context of Equation (1)), $x_{inc}(t)$ is the time-domain signal transmitted by the incumbent cell (may be cumulative across all incumbent users and base stations in the context of Equation (1), and $n(t)$ is the time-domain noise signal. Baseband processing circuit 416 may either receive the downlink signal during a downlink subframe if the shared spectrum is utilized for a TDD system or receive the downlink signal on a downlink band if the shared spectrum is utilized for an FDD system. As the incumbent signal $x_{inc}(t)$ originates from the incumbent, baseband processing circuit 410 may not be able to decode or demodulate the incumbent signal $x_{inc}(t)$.

Baseband processing circuit 416 may then transform the received time-domain downlink signal of Equation (1) into the frequency domain in 704b (e.g. by utilizing a frequency transform operation such as a Fast Fourier Transform (FFT)) to yield $$Y_d(f)=H_{rs}(f)*X_{rs}(f)+H_{inc}(f)*X_{inc}(f)+N(f), \quad (2)$$

where $Y_d(f)$, $H_{rs}(f)$, $X_{rs}(f)$, $H_{inc}(f)$, $X_{inc}(f)$, and $N(f)$ give the respective frequency representation of $y_d(t)$, $h_{rs}(t)$, $x_{rs}(t)$, $h_{inc}(t)$, $x_{inc}(t)$, and $n(t)$ and * denotes the convolution operation.

Baseband processing circuit 416 may additionally perform a downlink signal power measurement (such as e.g. a Received Signal Strength Indicator (RSSI) or similar signal power measurement) on $y_d(t)$ in order to obtain the overall downlink signal power $P_d$ in 704c given as $$P_d=P_{rs}+P_{inc}+P_n, \quad (3)$$

where $P_d$ is the total received downlink signal power, $P_{rs}$ is the received downlink reference signal power, $P_{inc}$ is the received incumbent signal power, and $P_n$ is the received noise power.

As licensee base station 310 may not transmit any other downlink symbols during a PSS occasion, downlink signal measurements by baseband processing circuit 416 on shared spectrum may only be composed of the reference signal, incumbent signal, and noise. While the following description may substantially focus on the application of PSS as the downlink reference signal, alternate downlink reference signals such as the aforementioned SSS and CRS in addition to other reference signals unique to other mobile communication technologies may analogously employed. However, certain downlink reference signals such as CRS may not offer the advantage of PSS of isolated downlink reference signals, i.e. base stations may transmit other downlink symbols during the same symbol interval as CRS symbols. Accordingly, Equations (1) to (3) may include additional contributions from other downlink symbols, and accordingly may not provide as accurate downlink measurements or may require further processing to isolate the received downlink signal.

As specified by 3GPP, PSSs may be predefined sequences known to both the base station and user, where each PSS is a Zadoff-Chu sequence composed of 64 symbols generated with a specific sequence root (with three possible roots in an LTE context, thus yielding three possible PSS sequences). Such Zadoff-Chu sequences are characterized as constant amplitude zero autocorrelation (CAZAC) sequences, and accordingly exhibit special correlation and autocorrelation properties. As a result, PSSs are substantially independent from other signals, and accordingly will exhibit substantially no correlation with signals other than matching PSSs, where a PSS root sequence will produce a delta dirac function δ when correlated with a zero-shifted version of itself and substantially zero correlation with another signal. It is appreciated that other downlink reference signals, including both CRS (based on Gold sequences) and SSS (based on pseudorandom noise sequences), may similarly exhibit a level of independence from other signals and may analogously be applied for the reference signal isolation.

Due to the aforementioned correlation characteristics of PSSs, the following correlations hold $$X_{rs}(f) \star X_{rs}(f)=\delta(f), X_{rs}(f) \star X_{inc}(f)=0,$$

$$X_{rs}(f) \star N(f)=0, X_{ul}(f) \star N(f)=0, \quad (4)$$

where $\delta(f)$ denotes the delta dirac function and $\star$ denotes the cross-correlation operation.

Accordingly, baseband processing circuit 416 may isolate the downlink reference signal channel frequency response $H_{rs}(f)$ by calculating the cross-correlation between the frequency-domain received downlink signal $Y_d(f)$ and the frequency transform of the downlink reference signal $X_{rs}(f)$ in 704d as follows $$Y_d(f) \star X_{rs}(f)=H_{rs}(f) \quad (5)$$

As previously indicated, downlink reference signals such as PSS may be predefined and thus known at both base stations and user terminals. Accordingly, each licensee user terminal may have prior knowledge of the downlink reference signal in both $x_{rs}(t)$ and the corresponding frequency representation $X_{rs}(f)$ (e.g. as each licensee user terminal will have previously determined the group identity of licensee base station 310 during synchronization and subsequent tracking using PSS).

Accordingly, baseband processing circuit 416 may isolate $H_{rs}(f)$ from the received downlink signal $Y_d(f)$ via cross-correlation as given in Equation (5). Baseband processing circuit 416 may then calculate the estimated downlink reference signal power $\hat{P}_{rs}$ (estimation of $P_{rs}$ from Equation (3)) in 704e as $$\hat{P}_{rs} = \frac{1}{N}\sum [H_{rs}(f)*X_{rs}(f)] \quad (6)$$
$$= \frac{1}{N}\sum [X_{rs}(f)*[Y_d(f) \star X_{rs}(f)]].$$

Upon calculating $\hat{P}_{rs}$ from the received downlink signal $Y_d(f)$, baseband processing circuit 416 may subsequently subtract $\hat{P}_{rs}$ from the received downlink signal power $P_d$ in 704f to yield $$P_d-\hat{P}_{rs}=P_{rs}-\hat{P}_{rs}+P_{inc}+P_n \approx P_{inc}+P_n, \quad (7)$$

where $P_{rs}-\hat{P}_{rs} \approx 0$ assuming an accurate estimate in the calculation of $\hat{P}_{rs}$ in Equation (6).

Baseband processing circuit 416 may then report the estimated incumbent signal power obtained from Equation (7) to licensee base station 310 as control signaling (e.g. as a measurement report). Such may be repeated at each licensee user terminal, and accordingly each licensee user terminal may thus obtain a signal power measurement containing the incumbent power and noise power. As previously indicated, noise may be statistically assumed constant over space and time for purposes of incumbent power estimation relative to licensee base station 310, and accordingly the signal power measurement obtained by each licensee user terminal may be assumed to contain a substantially equivalent contribution from noise. As the noise power may be assumed constant signal power measurements at all licensee user terminals, each licensee user terminal may then report the estimated incumbent signal power measurement for $P_d - P_{rs}$ to licensee base station 310 (e.g. as a measurement report via control signaling). Alternatively, each licensee user terminal may process report the estimated incumbent signal power measurement for $P_d - P_{rs}$ in order to remove a noise estimate $\hat{P}_n$ therefrom.

Accordingly, each licensee user terminal may obtain an incumbent signal power estimate by processing downlink signals according to known properties of downlink reference signals. Licensee base station 310 may then receive and evaluate these incumbent signal power estimations in 604 and 606 of method 600 to characterize the incumbent cell distance for each licensee user terminal, where licensee base station 310 may characterize licensee user terminals that report the strongest incumbent signal power estimates as being located the closest to the incumbent cell and licensee user terminals that report the weakest incumbent signal power estimates as being located the furthest from the incumbent cell. As previously detailed, licensee base station 310 may select measurement terminals and/or perform shared spectrum uplink power control based on the reported incumbent signal power estimates.

Following incumbent signal power estimation reporting in 704, baseband processing circuit 416 may determine in 706 whether licensee user terminal 410 has been assigned as a measurement terminal, which may include receiving control signaling specifying whether licensee user terminal 410 has been selected (or e.g. assuming that licensee user terminal 410 has not been selected if no control signaling is received.)

If baseband processing circuit 416 determines in 706 that licensee user terminal has not been assigned as a measurement terminal, baseband processing circuit 416 may proceed to 710 to receive a shared spectrum uplink allocation via control signaling from licensee base station 310 (as previously detailed regarding 614). Baseband processing circuit 416 may then in 712 perform uplink communications according to the shared spectrum allocation received in 710, which may include utilizing shared spectrum for uplink, utilizing shared spectrum for uplink according to a shared spectrum uplink transmit power threshold specified by licensee base station 310, or not utilizing shared spectrum for uplink. It is again noted that licensee user terminal 310 may additionally be able to utilize shared spectrum for downlink and dedicated licensed spectrum for uplink and/or downlink.

If baseband processing circuit 416 determines in 706 that licensee user terminal 410 has been selected as measurement terminal, baseband processing circuit 416 may need to perform shared spectrum uplink interference estimations and report the shared spectrum uplink interference estimations to licensee base station 310. Accordingly, baseband processing circuit 416 may identify in 706 via control signaling a request for shared spectrum uplink interference estimations from licensee base station 310, which may specify either single-instance estimations, periodic estimations, or autonomous estimations. As licensee user terminal 410 is likely located proximate to the incumbent cell by virtue of selection as a measurement terminal, it may be unlikely that licensee user terminal 410 will be allocated any uplink transmission resources. However, it is nevertheless recognized that such may be possible (such as if interference to the incumbent is very low), and accordingly baseband processing circuit 416 may obtain a shared spectrum uplink allocation from licensee base station 310 that baseband processing circuit 416 may utilize to perform uplink transmissions on shared spectrum. While not explicitly depicted in FIG. 7, licensee user terminal 410 may additionally perform uplink and downlink communication on dedicated licensed spectrum.

Baseband processing circuit 416 may then perform the uplink interference estimation in 708. Baseband processing circuit 416 may thus attempt to estimate the total interference contributed by all licensee user terminals that are utilizing shared spectrum for uplink transmissions. The uplink interference estimation of 708 may be summarized as follows:

708a. Perform uplink signal power measurement
708b. Perform downlink signal power measurement
708c. Perform downlink reference signal power measurement
708d. Calculate estimated uplink interference to the incumbent
708e. Report estimated uplink interference to licensee base station Accordingly, baseband processing circuit 416 may first perform an uplink signal power measurement in 708a to obtain the received uplink signal power $P_u$ (e.g. during a TDD uplink subframe or on a TDD uplink band), which may include receiving a time-domain uplink signal $y_u(t)$ given as $$y_u(t) = \sum_{i=1}^{N_{up}} h_{ul}^i(t) x_{ul}^i(t) + h_{inc(t)} x_{inc}(t) + n(t), \tag{8}$$

with corresponding frequency-domain uplink signal $Y_u(f)$ $$Y_u(f) = \sum_{i=1}^{N_{up}} H_{ul}^i(f) X_{ul}^i(f) + H_{inc}(f) X_{inc}(f) + N(f), \tag{9}$$

where $N_{up}$ denotes the number of licensee user terminals using shared spectrum for uplink, $h_{ul}^i(t)$ and $H_{ul}^i(f)$ respectively denote the impulse response and channel response between the i-th uplink licensee user terminal and licensee user terminal 410, $x_{ul}^i(t)$ and $H_{ul}^i(f)$ respectively denote the time-domain and frequency-domain uplink signal transmitted by the i-the uplink licensee user terminal.

The received uplink signal power $P_u$ is thus given as $$P_u = P_{ul} + P_{inc} + P_n, \tag{10}$$

where $P_{ul}$ is the uplink interference, $P_{inc}$ is the received incumbent signal power, and $P_n$ is the received noise signal power (both as introduced in Equation (3)).

Baseband processing circuit 416 may additionally perform a downlink signal power measurement in 708b to obtain the downlink signal power $P_d$ (as detailed regarding Equation (3) and 704*c*). Baseband processing circuit 416 may either utilize the same downlink signal power measurement for $P_d$ obtained in 704*c* or may alternatively perform an updated downlink signal power measurement to obtain $P_d$.

Baseband processing circuit 416 may additionally perform a downlink reference signal power measurement in 708*c* to obtain a downlink reference signal power estimate $\hat{P}_{rs}$ as detailed regarding Equation (6) and 704*e*. Baseband processing circuit 416 may either obtain an updated downlink reference signal power estimate $\hat{P}_{rs}$ (e.g. based on an updated received downlink signal $y_d(t)$ and $Y_d(f)$) or may alternatively utilize the downlink reference signal power estimate $\hat{P}_{rs}$ obtained in 704*e*.

Baseband processing circuit 416 may then obtain an uplink interference estimate $\hat{P}_{ul}$ that approximates $P_{ul}$ from Equation (10) using $P_d$, $P_u$, and $\hat{P}_{rs}$ as obtained in 708*a*-708*c*. Specifically, baseband processing circuit 416 may calculate $\hat{P}_{ul}$ in 708*d* as $$\hat{P}_{ul} = P_u + \hat{P}_{rs} - P_d \quad (11)$$
$$= P_{ul} + P_{inc} + P_n + \hat{P}_{rs} - P_{rs} - P_{inc} - P_n$$
$$= P_{ul} + \hat{P}_{rs} - P_{rs},$$

i.e. by subtracting the received downlink signal power $P_d$ from the received uplink signal power $P_u$ and adding the downlink reference signal power estimation $\hat{P}_{rs}$.

Assuming an accurate estimation for $P_{rs}$ in $\hat{P}_{rs}$, baseband processing circuit 416 may obtain $\hat{P}_{ul} \approx P_{ul}$ in 708*d*. Baseband processing circuit 416 may thus obtain an estimate for the interference to the incumbent caused by uplink transmissions of licensee user terminals in 708, which baseband processing circuit 416 may subsequently report to licensee base station 310 in 708*e*. Each measurement terminal may equivalently calculate and report uplink interference estimations to licensee base station 310, which (as detailed in regarding 610-614) licensee base station 310 may utilize the uplink interference estimations to evaluate the current levels of uplink interference and decide whether shared spectrum uplink power control is necessary.

Accordingly, licensee base station 310 may be able to select appropriate licensee user terminals to use as measurement terminals and perform shared spectrum uplink power control procedures based on incumbent signal power estimations reported by the licensee user terminals.

In the procedures detailed above in FIG. 5 and FIG. 6, licensee base station 310 may request that each licensee user terminal perform and report incumbent signal power estimates (in 602-604 and 702-704). However, the calculations in 704*a*-704*f* may require appreciable computational power and thus may result in a large power penalty for each licensee user terminal.

In order to reduce power consumption at the licensee user terminals, licensee base station 310 may instead make a "preliminary" selection of licensee user terminals to request incumbent signal power estimates from. In particular, licensee base station 310 may require licensee user terminals to report downlink channel conditions, which may be specified as part of a wireless communication protocol (e.g. LTE, UMTS, GSM, CDMA, etc.). Accordingly, the licensee user terminals may be required to measure downlink reference signals and provide corresponding downlink reference signal power measurements to licensee base station 310.

Figure 8:
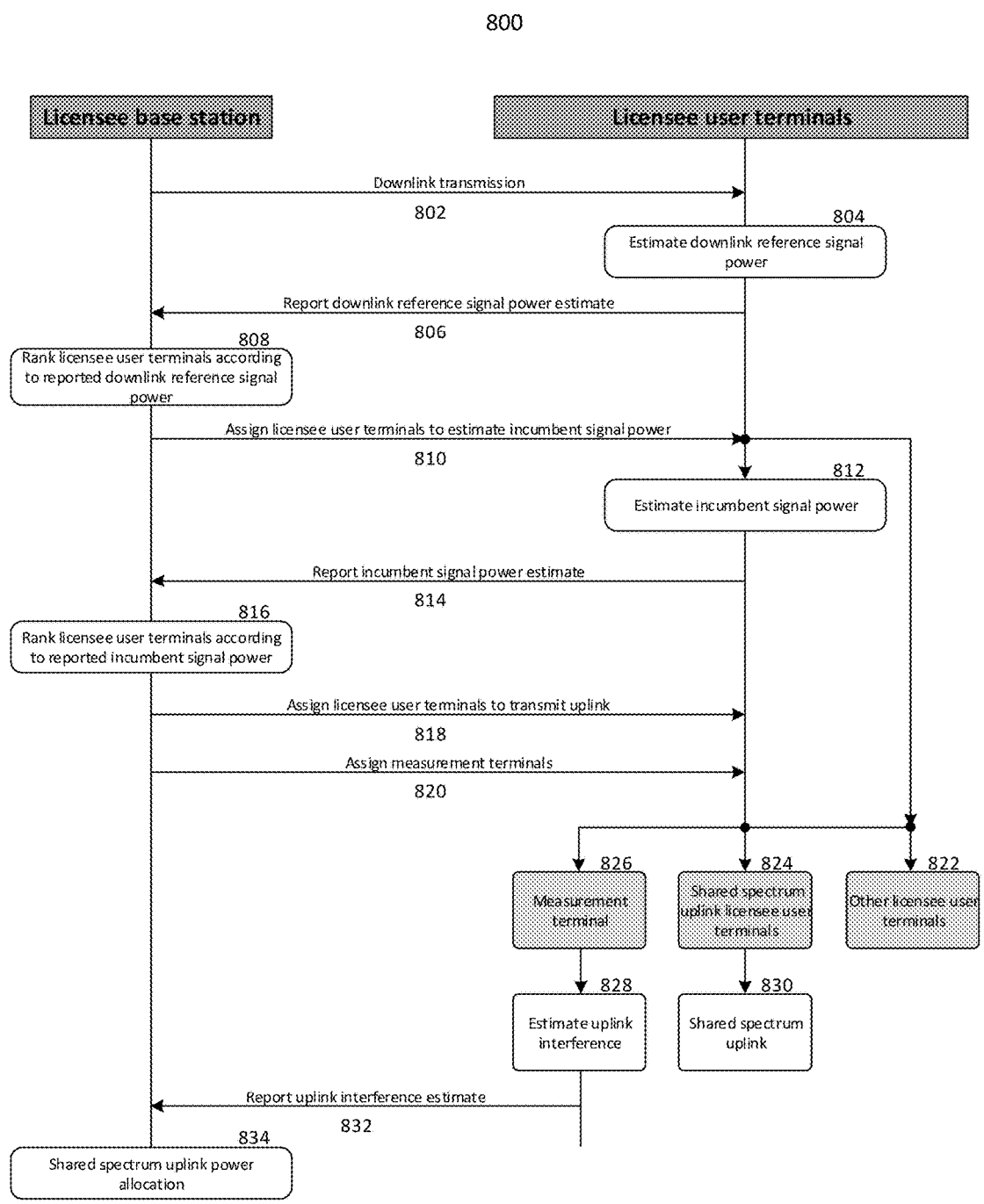
FIG. 8 shows a message sequence chart illustrating measurement terminal and uplink power control procedure.

FIG. 8 shows message sequence chart 800 that illustrates a preliminary selection of licensee user terminals by licensee base station 310.

In 802, licensee base station 310 may perform a downlink transmission, which may include a downlink reference signal (e.g. PSS, SSS, CRS, etc.). Each licensee user terminal may receive the downlink transmission and perform a downlink reference signal power estimation at 804 (e.g. at baseband processing circuit 416 as detailed regarding Equation (6) and 704*a*-704*e*). As previously indicated, the wireless communication protocol utilized by licensee base station 310 and the licensee user terminals may require the licensee user terminals to periodically estimate and report received downlink reference signal power. Accordingly, the licensee user terminals may perform the downlink signal power estimate in 804 and subsequently report the downlink signal power estimate in 806 as part of the wireless communication protocol, such as via a measurement procedure report.

Licensee base station 310 (uplink control circuit 318) may then rank the licensee user terminals according to reported downlink reference signal power in 808, such as in ascending order by ranking the licensee user terminals that report the strongest downlink signal power estimates the highest and the licensee user terminals that report the weakest downlink signal power estimates the lowest. Analogously to as detailed above regarding received incumbent signal power, licensee base station 310 may characterize the licensee user terminals that report the strongest downlink signal power estimates as being located the closest to licensee base station 310 and conversely characterize the licensee user terminals that report the weakest downlink signal power estimates as being located the furthest from licensee base station 310.

Accordingly, licensee base station 310 may be able to determine which of the licensee user terminals are located at the cell edge based on the ranking obtained in 808 (and may additionally compare reported downlink reference signal power estimates to a predetermined signal power threshold to further identify cell-edge terminals). By identifying which of the licensee user terminals are closest to the cell edge, licensee base station 310 may obtain a preliminary selection of licensee user terminals that would be suitable for either measurement terminal selection or shared spectrum uplink usage. Specifically, licensee base station 310 may wish to select only the licensee user terminals that are located closest to the incumbent cell as measurement terminals (as shown in FIG. 5), which accordingly may be located at the cell edge of the licensee cell. Licensee base station 310 may thus preliminarily select the cell-edge terminals identified in 808 for eligibility in measurement terminal selection.

Similarly, licensee base station 310 may wish to select licensee user terminals on the opposite edge of the licensee to allow to utilize shared spectrum for uplink, as these licensee user terminals may be located furthest from the incumbent cell and thus will contribute the least to uplink interference to the incumbent.

While licensee base station 310 may be able to identify the cell-edge licensee user terminals based on reported downlink reference signal power estimates, licensee base station 310 may not be able to identify exactly where on the cell-edge each licensee user terminal is located, and accordingly may not be able to select measurement terminals or allocate shared spectrum uplink power usage solely based on reported downlink reference signal power estimates.

Licensee base station 310 (uplink control circuit 318) may then assign the cell-edge licensee user terminals to estimate the incumbent signal power in 810. Accordingly, some of the licensee user terminals (identified as cell-edge terminals in 808) may be assigned to estimate the incumbent signal power while others (not identified as cell-edge terminals in 808) may not be assigned to estimate the incumbent signal power. Accordingly, the licensee user terminals that are not assigned to estimate the incumbent signal power may not need to perform the incumbent signal power calculations or reporting of 704*a*-704*g*, and accordingly may save power; however, as these licensee user terminals do not report incumbent signal power estimates licensee base station 310 may not be able to consider these licensee user terminals as measurement terminals and/or for shared spectrum uplink usage.

Accordingly, the licensee user terminals assigned for incumbent signal power estimation may estimate the incumbent signal power in 812 (704*a*-704*g*) and report the incumbent signal power estimates to licensee base station 310 at 814. The remaining licensee use terminals not assigned for incumbent signal power estimation may be assigned as other licensee user terminals as 822, which may not be measurement terminals and may not use shared spectrum for uplink activity (although may still utilize shared spectrum for downlink and/or dedicated licensed spectrum for uplink and downlink).

Licensee base station 310 (uplink control circuit 318) may then rank the cell-edge user terminals according to reported incumbent signal power estimates in 816, such as by ranking the cell-edge user terminals that report the strongest incumbent signal power estimates the highest and ranking the cell-edge user terminals that report the weakest incumbent signal power estimates the lowest. Licensee base station 310 may thus identify the cell-edge user terminals that report the strongest incumbent signal power estimates as being located closest to the incumbent while identifying the cell-edge user terminals that report the weakest incumbent signal power estimates as being located the furthest from the incumbent.

Accordingly, licensee base station 310 (uplink control circuit 318) may identify the cell-edge user terminals that report the weakest incumbent signal power estimates as licensee user terminals that are permitted to utilize shared spectrum for uplink and subsequently assign these licensee user terminal to utilize shared spectrum for uplink in 818. Licensee base station 310 may identify the cell-edge licensee user terminals that report the strongest incumbent signal power estimates as the measurement terminals and subsequently assign these licensee user terminals as measurement terminals in 820.

Each licensee user terminal may thus be assigned as either a measurement terminal at 826, a shared spectrum licensee user terminal at 824, or an "other" licensee user terminal at 822 (not shared spectrum uplink and not a measurement terminal).

The measurement terminals may thus estimate the uplink interference to the incumbent in 828 (708*a*-708*d*) and report the estimated incumbent signal power to licensee base station in 832 (708*e*), which licensee base station 310 may utilize for shared spectrum uplink power allocation.

The shared spectrum uplink terminals may be allowed to utilize shared spectrum for uplink in 830, and accordingly may begin uplink transmission on shared spectrum. Depending on the uplink interference estimates reported by the measurement terminals in 832, licensee base station 310 may adjust the shared spectrum uplink power allocation for the shared spectrum uplink terminals, such as by disabling shared spectrum uplink and/or reducing the permitted shared spectrum uplink transmit power as part of shared spectrum uplink power control procedures.

The other licensee user terminals may not be measurement terminals and may not be allowed to utilize shared spectrum for uplink, and accordingly may utilize dedicated licensed spectrum for uplink and downlink potentially in addition to shared spectrum for downlink. If licensee base station 310 determines that the uplink interference to the incumbent is appreciably within acceptable levels, licensee base station 310 may at a later time permit one or more of the other licensee user terminals to utilize shared spectrum for uplink (which may optionally also include requesting incumbent signal power estimates from the other licensee user terminals to allow licensee base station 310 to identify other licensee user terminals located far from the incumbent cell that may be suitable for shared spectrum uplink usage).

Licensee base station 310 may alternatively only select licensee user terminals that wish to be allocated uplink resources as measurement terminals and/or shared spectrum uplink terminals. For example, only some of the licensee user terminals may have requested uplink resources from licensee base station 310 (e.g. via control signaling), and accordingly the remaining licensee user terminals may only require downlink resources (either in a radio active state or a radio idle state). Accordingly, licensee base station 310 may only consider the licensee user terminals that have requested uplink resources for measurement terminals and/or shared spectrum uplink, and accordingly may allow the remaining licensee user terminals to conserve power by avoiding any incumbent signal power and/or uplink interference estimate calculations.

Accordingly, licensee base station 310 may rely on incumbent signal power estimates reported by licensee user terminals in order to identify measurement terminals and/or perform shared spectrum uplink allocations. Licensee base station 310 may additionally employ reported downlink reference signal estimates to tentatively identify eligible measurement and shared spectrum uplink terminals, which may conserve power at certain licensee user terminals as these licensee user terminals may not need to calculate or report incumbent signal power.

Furthermore, certain calculations detailed as being performed by a licensee user terminal (e.g. baseband processing circuit 416) in 704 and 708 may alternatively be performed by licensee base station 310. For example, a licensee user terminal such as licensee user terminal 410 may receive downlink and/or uplink signals and report signal power estimates back to licensee base station 310, which may subsequently (at uplink control circuit 318) perform some or all of the calculations detailed in 704 and/or 708 in order to obtain incumbent signal power and uplink interference estimates. Furthermore, licensee user terminals may utilize device-to-device communication schemes such as Proximity Services (ProSe, also known as D2D), WiFi Direct, or Bluetooth, in order to aggregate calculations. For example, one or more mobile terminals may provide a specific mobile terminal with obtained signal power measurements needed for incumbent signal power and/or uplink interference calculations. The specific mobile terminal may then perform the calculations for the one or more mobile terminals, which may include averaging or aggregating (including selecting a single value to report) signal power measurements and/or calculation results, and report the resulting individual or aggregated measurements to licensee base station 310. Such may allow the one or more mobile terminals to offload processing in order to conserve power.

Additionally, while the uplink control processing at a licensee base station has been detailed above as being performed by an uplink control circuit located at the licensee base station, some or all of the processing may be performed at a separate component located in the core network that is interfaced with licensee base station 310. For example, an LSA or SAS entity may be interfaced with licensee base station 310, and licensee base station 310 may provide various signal power and interference measurements to this LSA or SAS entity. The LSA or SAS entity may then perform the requisite processing (e.g. to identify measurement terminals and/or to determine appropriate shared spectrum uplink power allocation measures) and provide the results to licensee base station 310. It is thus not limited that the uplink control circuit be located at a single licensee base station.

It is noted that FIG. 5 depicts a simplified scenario in which a single incumbent cell is located proximate to a single licensee cell. In actual implementations, more than one incumbent cell may be located proximate to a licensee cell, which may affect the incumbent signal power measurements reported to licensee base station 310 by the licensee user terminals. Licensee base station 310 may nevertheless adopt an equivalent approach in selecting measurement terminals and allocating shared spectrum uplink based on incumbent signal power estimates reported by the licensee user terminals. For example, if licensee base station 310 is surrounded by incumbent cells, licensee base station 310 may select cell-edge terminals on all sides as measurement terminals as such cell-edge terminals will report strong incumbent signal power estimates due to the proximity to one or more of the surrounding incumbent cells. Licensee base station 310 may additionally allocate higher shared spectrum uplink transmit powers to licensee user terminals located proximate to licensee base station 310 (e.g. at the center of the licensee cell) as such licensee user terminals may be the furthest from the surrounding incumbent cells.

Similarly, an implemented spectrum sharing scheme may provide multiple shared spectrum bands, e.g. where licensee base station 310 shares multiple frequency bands with one or more incumbents. The procedures detailed above may equivalently be applied to each individual shared spectrum band, and may additionally allow for licensee base station 310 to switch licensee user terminals between shared spectrum bands in order to better manage uplink interference.

Figure 9:
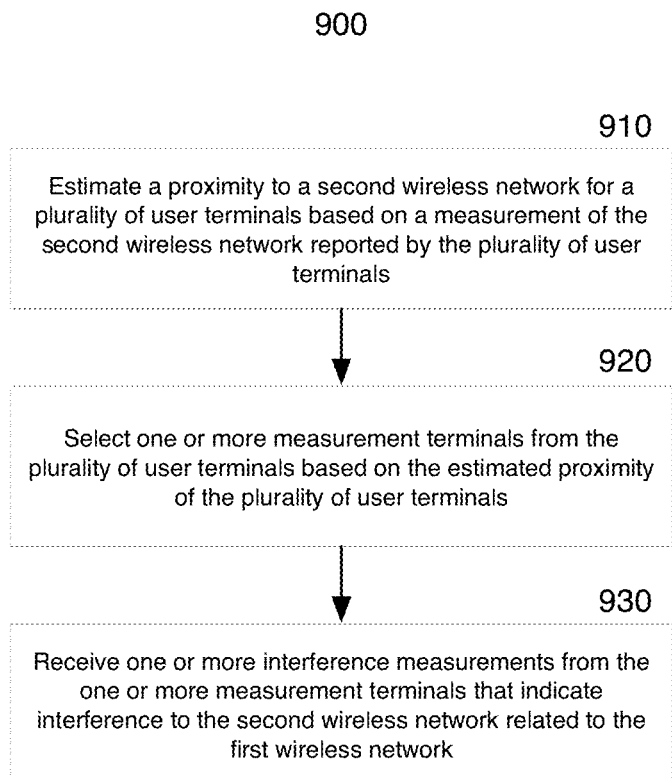
FIG. 9 shows a method for obtaining interference measurements.

FIG. 9 shows method 900 at a control device of a first wireless network. As shown in FIG. 9, method 900 includes estimating a proximity to a second wireless network for each of a plurality of user terminals based on a measurement of the second wireless network reported by each of the plurality of user terminals (910), selecting one or more measurement terminals from the plurality of user terminals based on the estimated proximity of each of the plurality of user terminals (920), and receiving one or more interference measurements from the one or more measurement terminals that indicate interference to the second wireless network caused by the first wireless network (930).

In one or more further exemplary aspects of the disclosure, one or more of the features described above in reference to FIGS. 1-8 may be further incorporated into method 900. In particular, method 900 may be configured to perform further and/or alternate processes as detailed regarding licensee base station 310 and/or uplink control circuit 318.

Figure 10:
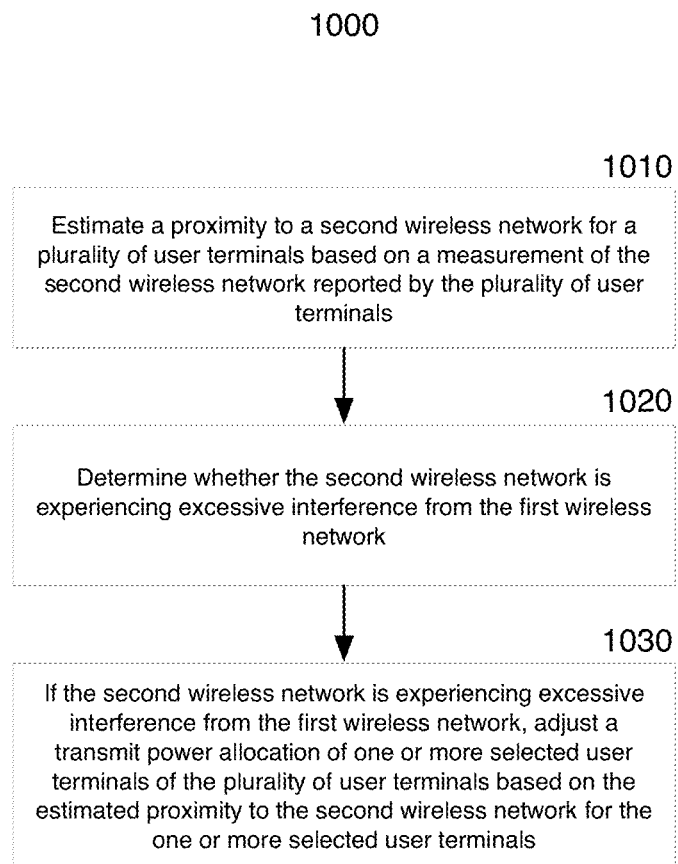
FIG. 10 shows a method for performing transmission power control.

FIG. 10 shows method 1000 at a control device of a first wireless network. As shown in FIG. 10, method 1000 includes estimating a proximity to a second wireless network for each of a plurality of user terminals based on a measurement of the second wireless network reported by each of the plurality of user terminals (1010), determining whether the second wireless network is experiencing excessive interference from the first wireless network (1020), and if the second wireless network is experiencing excessive interference from the first wireless network, adjusting a transmit power allocation of one or more selected user terminals of the plurality of user terminals based on the estimated proximity to the second wireless network for each of the one or more selected user terminals (1030).

In one or more further exemplary aspects of the disclosure, one or more of the features described above in reference to FIGS. 1-8 may be further incorporated into method 1000. In particular, method 1000 may be configured to perform further and/or alternate processes as detailed regarding licensee base station 310 and/or uplink control circuit 318.

Figure 11:
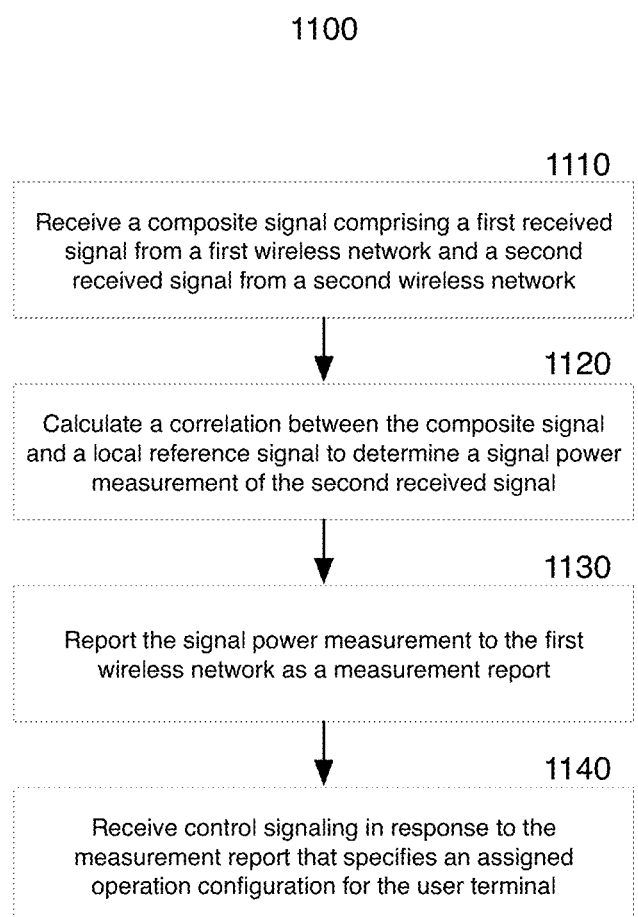
FIG. 11 shows a method for reporting measurements.

FIG. 11 shows method 1100 at a user terminal. As shown in FIG. 11, method 1100 includes receiving a composite signal including a first received signal from a first wireless network and a second received signal from a second wireless network (1110), calculating a correlation between the composite signal and a local reference signal to determine a signal power measurement of the second received signal (1120), reporting the signal power measurement to the first wireless network as a measurement report (1130), and receiving control signaling in response to the measurement report that specifies an assigned operation configuration for the user terminal (1140).

In one or more further exemplary aspects of the disclosure, one or more of the features described above in reference to FIGS. 1-8 may be further incorporated into method 1100. In particular, method 1100 may be configured to perform further and/or alternate processes as detailed regarding licensee user terminal 410 and/or baseband processing circuit 416.

The above description may thus relate to interference between two (or more) networks, which may include two networks of the same radio access technology or two networks of different radio access technologies. The networks may each operate on available spectrum, which may be the overall pool of spectral radio resources (by frequency) available to the networks. The spectrum available to each network may be different, and may include both exclusive spectrum (e.g. only available to certain network operators based on licensing) and non-exclusive spectrum (e.g. available to more than one network operator). The available spectrum may be shared between two (or more) networks, such as according to the spectrum sharing systems detailed herein, which may include spectrum sharing on an incumbent/licensee basis.

Furthermore, shared spectrum may be accessed according to a tier system that defines higher- and lower-tier users, which may range (in order from high to low) in e.g. LSA from incumbent to licensee users and in e.g. SAS from incumbent users to priority users (e.g. PAL users) to general users (e.g. GAA users). The shared spectrum allocated may be dynamic, and accordingly may be dynamically reassigned by a controller entity (e.g. LSA controller, SAS entity, etc.) between incumbents and various tiered licensee users. The shared spectrum may be specified as spectrum information, which may include specific frequency bands.

The various users in shared spectrum schemes may need to consider interference levels, in particular between licensee users and incumbents, which may include licensee users monitoring the level of interference to an incumbent in order to ensure that the interference remains below certain levels. Certain networks may cause interference to other networks, which may occur when radio activity by a first network interrupts, obstructs, or degrades radio activity of at least a second network. Accordingly, licensee users may have an interference level allowance that dictates a permitted level of interference to an incumbent. Such interference level allowances may be stored in a storage element responsible for holding and providing interference level allowances, which may be dynamic and thus may change over time. Such storage elements may be located within licensee networks within incumbent networks, and/or separately from both licensee and incumbent networks, which may include storage elements located within SAS and/or LSA components (such as e.g. LSA controllers and SAS entities).

While the above description has focused on LSA and SAS spectrum sharing systems, further bands may also emerge as candidates for spectrum sharing, including in particular frequency bands under 6 GHz traditionally utilized for wireless communications as well as centimeter- and millimeter-wavelength bands above 6 GHz. Accordingly, the descriptions herein are considered demonstrative in nature and may be analogously applied to any spectrum sharing scheme independent of the particular frequency bands targeted for sharing.

The above description includes references related to a "proximity to a wireless network", such as in the incumbent cell distance employed by uplink control circuit 318. Such a proximity to a wireless network includes i) the minimum geographic distance of users from one network (network "A") to users of another network (network "B"). Then, the "distance between both networks" corresponds to the geographic distance of those two users (one from network "A" and the other one from network "B") such that the distance becomes minimum, ii) the average distance of a sub-set of users from network "A" and network "B" is considered, typically the subset is chosen such that the distances between users from the "network "A" subset" and the "network "B" subset" are minimum, iii) any other sub-set of users may be taken from network "A" and network "B" based on metrics such as geographic distance, signal strength at the BS/AP of network "A" and/or network "B" or other network nodes, geographic distance from serving/neighboring BS/AP, etc., iv) the distance of users from network "A" (and "B") and their respective distance to their respective serving BS/AP. Those users with large distance to the serving BS/AP are considered to be at the cell edge and those close to a neighboring cell, a specific neighboring cell may be identified through calculation of an angle of a connecting line between the concerned user device and its serving cell, v) the users of a cell may be split into a hierarchy of sub-sets, e.g. users with the largest distance from the serving BS/AP may be part of the tier-1 hierarchy, users with a medium distance from the serving BS/AP may be part of the tier-2 hierarchy, users with the smallest distance from the serving BS/AP may be part of the tier-3 hierarchy; then, the average distance of users from selected tiers between two neighboring cells is calculated. Distances can be determined for example by measuring the propagation delay, by considering the propagation delay of the strongest signal components in a multipath propagation environment (requires the derivation of the channel impulse response), etc.

Furthermore, licensees in spectrum sharing schemes may not be limited to MNOs, and accordingly a licensee may refer to any entity that licenses spectrum in spectrum sharing scheme. Additionally, the interference mitigation detailed herein may be applied to any two or more networks (e.g. the incumbent network and the licensee network included in wireless network 300), where the two or more networks may utilize the same RAT or different RATS. Furthermore, the two or more networks may be party of a priority hierarchy, such as where a first network has a higher priority than a second network and accordingly interference from the second network onto the first network may need to be minimized/kept below a (predefined) threshold/prevented/reduced/etc.

It is appreciated that the terms "user equipment", "UE", "mobile terminal", etc., may apply to any wireless communication device, including cellular phones, tablets, laptops, personal computers, and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

All acronyms defined in the above description additionally hold in all claims included herein.

The following examples pertain to further aspects of the disclosure:

Example 1 is a method at a control device of a first wireless network for obtaining interference measurements, the method including estimating a proximity to a second wireless network for a plurality of user terminals based on a measurement of the second wireless network reported by the plurality of user terminals, selecting one or more measurement terminals from the plurality of user terminals based on the estimated proximity of the plurality of user terminals, and receiving one or more interference measurements from the one or more measurement terminals that indicate interference to the second wireless network related to the first wireless network.

In Example 2, the subject matter of Example 1 can optionally include wherein the first wireless network and the second wireless network operate on a shared frequency band.

In Example 3, the subject matter of Example 1 or 2 can optionally include wherein selecting one or more measurement terminals from the plurality of user terminals based on the estimated proximity of the plurality of user terminals includes selecting one or more of the plurality of user terminals that report the strongest measurements of the second wireless network as the one or more measurement terminals.

In Example 4, the subject matter of any one of Examples 1 to 3 can optionally include wherein estimating a proximity to a second wireless network for a plurality of user terminals based on a measurement of the second wireless network reported by the plurality of user terminals includes determining that one or more first user terminals of the plurality of user terminals that report strong measurements are located closer to the second wireless network than one or more second user terminals of the plurality of user terminals that report weak measurements.

In Example 5, the subject matter of any one of Examples 1 to 4 can optionally further include receiving the measurement of the second wireless network from each respective user terminal of the plurality of user terminals.

In Example 6, the subject matter of Example 1 can optionally include wherein estimating a proximity to a second wireless network for a plurality of user terminals based on a measurement of the second wireless network reported by the plurality of user terminals includes estimating the proximity to the second wireless network for the plurality of user terminals relative to the proximity of the other user terminals of the plurality of user terminals to the second wireless network based on the measurement of the second wireless network reported by the plurality of user terminals.

In Example 7, the subject matter of Example 1 can optionally include wherein the measurement of the second wireless network reported by the plurality of user terminals is a signal power measurement of the second wireless network, and wherein estimating a proximity to a second wireless network for a plurality of user terminals based on a measurement of the second wireless network reported by the plurality of user terminals includes ranking the plurality of user terminals in order according to the signal power measurement reported by the plurality of user terminals.

In Example 8, the subject matter of Example 1 can optionally include wherein the measurement of the second wireless network reported by the plurality of user terminals is a signal power measurement of the second wireless network, and wherein estimating a proximity to a second wireless network for a plurality of user terminals based on a measurement of the second wireless network reported by the plurality of user terminals includes at least one of ranking the plurality of user terminals according to the signal power measurement reported by the plurality of user terminals, comparing a signal power measurement reported by a first user terminal of the plurality of user terminals to a signal power measurement reported by a second user terminal of the plurality of user terminals, comparing the signal power measurement reported by the plurality of user terminals to a signal power threshold, or calculating an approximate proximity from the second wireless network based on the signal power measurement.

In Example 9, the subject matter of Example 1 can optionally further include estimating a proximity to a transmission point of the first wireless network of a further plurality of user terminals based on a measurement of the transmission point reported by the further plurality of user terminals, and selecting the plurality of user terminals from the further plurality of user terminals based on the estimated proximity of the further plurality of user terminals from the transmission point.

In Example 10, the subject matter of Example 9 can optionally further include selecting the user terminals of the further plurality of user terminals that have the farthest estimated proximity from the transmission point as the plurality of user terminals.

In Example 11, the subject matter of any one of Examples 1 to 10 can optionally further include determining whether to perform uplink power control based on the one or more interference measurements.

In Example 12, the subject matter of Example 11 can optionally include wherein determining whether to perform uplink power control based on the one or more interference measurements includes determining to perform uplink power control if the one or more interference measurements indicate excessive interference to the second wireless network.

In Example 13, the subject matter of Example 12 can optionally further include selecting one or more target user terminals from the plurality of user terminals to reduce allocated uplink transmit power based on the estimated proximity of the one or more target user terminals from the second wireless network.

In Example 14, the subject matter of Example 15 can optionally further include transmitting control signaling to the one or more target terminals that specifies a reduction in uplink transmit power allocation.

In Example 15, the subject matter of Example 11 can optionally include wherein determining whether to perform uplink power control based on the one or more interference measurements includes comparing the one or more interference measurements to a predetermined interference threshold, and determining to perform uplink power control if the one or more interference measurements satisfy the predetermined interference threshold.

In Example 16, the subject matter of Example 15 can optionally include wherein the first wireless network is a licensee in a spectrum sharing system and the second wireless network is an incumbent in the spectrum sharing system, and wherein the predetermined interference threshold is based on an incumbent protection interference threshold of the spectrum sharing system.

In Example 17, the subject matter of Example 16 can optionally include wherein the first wireless network is located in a protection zone of the spectrum sharing system and the incumbent protection interference threshold is an interference threshold for the protection zone.

In Example 18, the subject matter of Example 15 can optionally include wherein determining whether to perform uplink power control based on the one or more interference measurements further includes determining not to perform uplink power control if the one or more interference measurements is below the predetermined interference threshold.

In Example 19, the subject matter of any one of Examples 1 to 18 can optionally include wherein the measurement of the second wireless network reported by a first user terminal of the plurality of user terminals is a signal power measurement that indicates a signal power of a signal received by the first user terminal from the second wireless network.

In Example 20, the subject matter of any one of Examples 1 to 19 can optionally include wherein the plurality of user terminals utilize a first radio frequency band that overlaps with a second radio frequency band utilized by the second wireless network.

In Example 21, the subject matter of any one of Examples 1 to 20 can optionally include wherein the first wireless network utilizes a shared frequency with the second wireless network.

In Example 22, the subject matter of any one of Examples 1 to 21 can optionally include wherein the first wireless network utilizes a shared frequency with the second wireless network as part of a spectrum sharing system.

In Example 23, the subject matter of any one of Examples 1 to 22 can optionally include wherein the first wireless network is a licensee in a spectrum sharing system and the second wireless network is an incumbent in the spectrum sharing system.

In Example 24, the subject matter of Example 23 can optionally include wherein the spectrum sharing system is a Licensed Shared Access (LSA) system or a Spectrum Access System (SAS) system.

In Example 25, the subject matter of Example 23 or 24 can optionally include wherein the first wireless network is located in a protection zone of the spectrum sharing system.

In Example 26, the subject matter of any one of Examples 1 to 25 can optionally include wherein the control device is a base station of the first wireless network.

In Example 27, the subject matter of any one of Examples 1 to 25 can optionally include wherein the control device is located at a base station of the first wireless network.

In Example 28, the subject matter of any one of Examples 1 to 27 can optionally include wherein the first wireless network is operated by a different network operator than the second wireless network.

Example 29 is a network control device including a network control circuit configured to perform the method of any one of Examples 1 to 28.

Example 30 is a base station device including a network control circuit configured to perform the method of any one of Examples 1 to 28.

Example 31 is a non-transitory computer readable medium storing instructions which when executed by a processor control the processor to perform the method of any one of Examples 1 to 28.

Example 32 is a method at a control device of a first wireless network for performing transmission power control, the method including estimating a proximity to a second wireless network for a plurality of user terminals based on a measurement of the second wireless network reported by the plurality of user terminals, determining whether the second wireless network is experiencing excessive interference from the first wireless network, and if the second wireless network is experiencing excessive interference from the first wireless network, adjusting a transmit power allocation of one or more selected user terminals of the plurality of user terminals based on the estimated proximity to the second wireless network for the one or more selected user terminals.

In Example 33, the subject matter of Example 32 can optionally include wherein the first wireless network and the second wireless network operate on a shared frequency band.

In Example 34, the subject matter of Example 32 or 33 can optionally further include if the second wireless network is not experiencing excessive interference from the first wireless network, performing one of maintaining the transmit power allocation of the one or more selected user terminals, or increasing the transmit power allocation of one or more further user terminals of the plurality of user terminals.

In Example 35, the subject matter of Example 34 can optionally include wherein increasing the transmit power allocation of one or more further user terminals of the plurality of user terminals includes selecting one or more user terminals of the plurality of user terminals that have far estimated proximities to the second wireless network as the one or more further user terminals.

In Example 36, the subject matter of Example 32 can optionally further include selecting the one or more selected user terminals from the plurality of user terminals based on which of the plurality of user terminals have close estimated proximities to the second wireless network.

In Example 37, the subject matter of Example 32 can optionally include wherein adjusting a transmit power allocation of one or more selected user terminals of the plurality of user terminals based on the estimated proximity to the second wireless network for the one or more selected user terminals includes selecting one or more user terminals of the plurality of user terminals that have close estimated proximities to the second wireless network as the one or more selected user terminals, and reducing the transmit power allocation of the one or more selected user terminals.

In Example 38, the subject matter of Example 32 can optionally include wherein adjusting a transmit power allocation of one or more selected user terminals of the plurality of user terminals based on the estimated proximity to the second wireless network for the one or more selected user terminals includes selecting one or more user terminals of the plurality of user terminals that have close estimated proximities to the second wireless network as the one or more selected user terminals, and allocating zero uplink transmit power for the one or more selected user terminals.

In Example 39, the subject matter of any one of Examples 32 to 38 can optionally further include receiving one or more interference measurements from one or more measurement terminals, and wherein determining whether the second wireless network is experiencing excessive interference from the first wireless network includes determining whether the second wireless network is experiencing excessive interference from the first wireless network based on the one or more interference measurements.

In Example 40, the subject matter of Example 39 can optionally include wherein the one or more measurement terminals are user terminals of the plurality of user terminals.

In Example 41, the subject matter of Example 39 can optionally further include selecting one or more measurement terminals from the plurality of user terminals, and receiving one or more one or more interference measurements from one or more measurement terminals, and wherein determining whether the second wireless network is experiencing excessive interference from the first wireless network includes determining whether the second wireless network is experiencing excessive interference from the first wireless network based on the one or more interference measurements.

In Example 42, the subject matter of Example 41 can optionally include wherein determining whether the second wireless network is experiencing excessive interference from the first wireless network based on the one or more interference measurements includes determining whether the one or more interference measurements satisfy predetermined interference criteria.

In Example 43, the subject matter of Example 42 can optionally include wherein the first wireless network is a licensee in a spectrum sharing system and the second wireless network is an incumbent in the spectrum sharing system, and wherein the predetermined interference criteria is interference criteria of the spectrum sharing system.

In Example 44, the subject matter of Example 42 can optionally include wherein the first wireless network operates in a protection zone of the spectrum sharing system, and wherein the predetermined interference criteria is protection zone interference criteria.

In Example 45, the subject matter of Example 41 can optionally include wherein determining whether the second wireless network is experiencing excessive interference from the first wireless network based on the one or more interference measurements includes comparing the one or more interference measurements to a predetermined interference threshold.

In Example 46, the subject matter of Example 45 can optionally include wherein the first wireless network is a licensee in a spectrum sharing system and the second wireless network is an incumbent in the spectrum sharing system, and wherein the predetermined interference threshold is an interference threshold of the spectrum sharing system.

In Example 47, the subject matter of Example 41 can optionally include wherein selecting one or more measurement terminals from the plurality of user terminals includes selecting the one or more measurement terminals from the plurality of user terminals based on the estimated proximity to the second wireless network for the one or more measurement terminals.

In Example 48, the subject matter of Example 47 can optionally include wherein selecting the one or more measurement terminals from the plurality of user terminals based on the estimated proximity to the second wireless network for the one or more measurement terminals includes selecting one or more user terminals of the plurality of user terminals that have the closest estimated proximities to the second wireless network of the plurality of user terminals as the one or more measurement terminals.

In Example 49, the subject matter of any one of Examples 32 to 48 can optionally include wherein adjusting a transmit power allocation of one or more selected user terminals of the plurality of user terminals based on the estimated proximity to the second wireless network for the one or more selected user terminals includes transmitting control signaling to the one or more selected user terminals that specifies an adjustment in transmit power allocation.

In Example 50, the subject matter of any one of Examples 32 to 49 can optionally include wherein adjusting a transmit power allocation of one or more selected user terminals of the plurality of user terminals based on the estimated proximity to the second wireless network for the one or more selected user terminals includes selecting one or more user terminals of the plurality of user terminals that report the strongest measurements of the second wireless network as the one or more selected terminals, and reducing the transmit power allocation of the one or more selected user terminals.

In Example 51, the subject matter of Example 32 can optionally include wherein estimating a proximity to a second wireless network for a plurality of user terminals based on a measurement of the second wireless network reported by the plurality of user terminals includes determining that one or more first user terminals of the plurality of user terminals that report strong measurements of the second wireless network are located closer to the second wireless network than one or more second user terminals of the plurality of user terminals that report weak measurements of the second wireless network.

In Example 52, the subject matter of Example 32 can optionally include wherein estimating a proximity to a second wireless network for a plurality of user terminals based on a measurement of the second wireless network reported by the plurality of user terminals includes estimating the proximity to the second wireless network for the plurality of user terminals relative to the proximity of the other user terminals of the plurality of user terminals to the second wireless network based on the measurement of the second wireless network reported by the plurality of user terminals.

In Example 53, the subject matter of Example 32 can optionally include wherein the measurement of the second wireless network reported by the plurality of user terminals is a signal power measurement of the second wireless network, and wherein estimating a proximity to a second wireless network for a plurality of user terminals based on a measurement of the second wireless network reported by the plurality of user terminals includes ranking the plurality of user terminals in order according to the signal power measurement reported by the plurality of user terminals.

In Example 54, the subject matter of Example 32 can optionally include wherein the measurement of the second wireless network reported by the plurality of user terminals is a signal power measurement of the second wireless network, and wherein estimating a proximity to a second wireless network for a plurality of user terminals based on a measurement of the second wireless network reported by the plurality of user terminals includes at least one of ranking the plurality of user terminals according to the signal power measurement reported by the plurality of user terminals, comparing a signal power measurement reported by a first user terminal of the plurality of user terminals to a signal power measurement reported by a second user terminal of the plurality of user terminals, comparing the signal power measurement reported by the plurality of user terminals to a signal power threshold, or calculating an approximate proximity from the second wireless network based on the signal power measurement.

In Example 55, the subject matter of any one of Examples 32 to 54 can optionally include wherein the measurement of the second wireless network reported by a first user terminal of the plurality of user terminals is a signal power measurement that indicates a signal power of a signal received by the first user terminal from the second wireless network.

In Example 56, the subject matter of any one of Examples 32 to 55 can optionally include wherein the plurality of user terminals utilize a first radio frequency band that overlaps with a second radio frequency band utilized by the second wireless network.

In Example 57, the subject matter of any one of Examples 32 to 56 can optionally include wherein the first wireless network utilizes a shared frequency with the second wireless network.

In Example 58, the subject matter of any one of Examples 32 to 57 can optionally include wherein the first wireless network utilizes a shared frequency with the second wireless network as part of a spectrum sharing system.

In Example 59, the subject matter of any one of Examples 32 to 58 can optionally include wherein the first wireless network is a licensee in a spectrum sharing system and the second wireless network is an incumbent in the spectrum sharing system.

In Example 60, the subject matter of Example 59 can optionally include wherein the spectrum sharing system is a Licensed Shared Access (LSA) system or a Spectrum Access System (SAS) system.

In Example 61, the subject matter of Example 59 can optionally include wherein the first wireless network is located in a protection zone of the spectrum sharing system.

In Example 62, the subject matter of any one of Examples 32 to 61 can optionally include wherein the control device is a base station of the first wireless network.

In Example 63, the subject matter of any one of Examples 32 to 62 can optionally include wherein the control device is located at a base station of the first wireless network.

In Example 64, the subject matter of any one of Examples 32 to 63 can optionally include wherein the first wireless network is operated by a different network operator than the second wireless network.

Example 65 is a network control device including a network control circuit configured to perform the method of any one of Examples 32 to 64.

Example 66 is a base station device including a network control circuit configured to perform the method of any one of Examples 32 to 64.

Example 67 is a non-transitory computer readable medium storing instructions which when executed by a processor control the processor to perform the method of any one of Examples 32 to 64.

Example 68 is a method at a user terminal for reporting measurements, the method including receiving a composite signal including a first received signal from a first wireless network and a second received signal from a second wireless network, calculating a correlation between the composite signal and a local reference signal to determine a signal power measurement of the second received signal, reporting the signal power measurement to the first wireless network as a measurement report, and receiving control signaling in response to the measurement report that specifies an assigned operation configuration for the user terminal.

In Example 69, the subject matter of Example 68 can optionally include wherein the first wireless network and the second wireless network operate on a shared frequency band.

In Example 70, the subject matter of Example 68 or 69 can optionally include wherein the receiving control signaling in response to the measurement report that specifies an operation assignment for the user terminal includes receiving a measurement operation assignment, the method further including performing an interference measurement that indicates interference to the second wireless network, and reporting the interference measurement to the first wireless network.

In Example 71, the subject matter of Example 70 can optionally include wherein the interference measurement indicates interference to the second wireless network related to the first wireless network.

In Example 72, the subject matter of Example 70 can optionally include wherein performing an interference measurement that indicates interference to the second wireless network includes subtracting a downlink reference signal power measurement from an uplink signal power measurement to obtain a signal power measurement difference, and subtracting an estimated reference signal power measurement from the signal power measurement difference to obtain the interference measurement.

In Example 73, the subject matter of any one of Examples 68 to 72 can optionally include wherein the receiving control signaling in response to the measurement report that specifies an operation assignment for the user terminal includes receiving a transmit power operation assignment that specifies a transmit power, the method further including transmitting signals according to the transmit power.

In Example 74, the subject matter of any one of Examples 68 to 73 can optionally include wherein calculating a correlation between the composite signal and a local reference signal to determine a signal power measurement of the second received signal includes calculating a cross-correlation between the composite signal and the local reference signal to obtain the signal power measurement of the second received signal.

In Example 75, the subject matter of any one of Examples 68 to 73 can optionally include wherein calculating a correlation between the composite signal and a local reference signal to determine a signal power measurement of the second received signal includes calculating a cross-correlation between the composite signal and the local reference signal to obtain a reference signal channel response, calculating a reference signal power measurement from the reference signal channel response, and subtracting the reference signal power measurement from a signal power measurement of the composite signal to obtain the signal power measurement of the second received signal.

In Example 76, the subject matter of Example 75 can optionally include wherein calculating a cross-correlation between the composite signal and the local reference signal to obtain a reference signal channel response includes calculating the cross-correlation between the composite signal and the local reference signal in the frequency domain to obtain the reference signal channel response as a reference signal channel frequency response.

In Example 77, the subject matter of Example 76 can optionally include wherein calculating a reference signal power measurement from the reference signal channel response includes calculating the reference signal power measurement from the reference signal channel frequency response.

In Example 78, the subject matter of any one of Examples 68 to 77 can optionally include wherein the first received signal includes a downlink reference signal transmitted by a transmission point of the first wireless network.

In Example 79, the subject matter of Example 78 can optionally include wherein receiving a composite signal including a first received signal from a first wireless network and a second received signal from a second wireless network includes receiving the composite signal during a downlink reference signal occasion of the first wireless network.

In Example 80, the subject matter of Example 78 can optionally include wherein the downlink reference signal is uncorrelated with the second received signal.

In Example 81, the subject matter of any one of Examples 78 to 80 can optionally include wherein the downlink reference signal is a Primary Synchronization Signal (PSS), a Secondary Synchronization Signal (SSS), or a Cell-specific Reference Signal (CRS).

In Example 82, the subject matter of any one of Examples 68 to 81 can optionally include wherein reporting the signal power measurement to the first wireless network as a measurement report includes transmitting the measurement report to an access point of the first wireless network.

In Example 83, the subject matter of any one of Examples 68 to 82 can optionally include wherein receiving a composite signal including a first received signal from a first wireless network and a second received signal from a second wireless network includes receiving the composite signal during a downlink subframe of the first wireless network or receiving the composite signal on a downlink frequency band of the first wireless network.

In Example 84, the subject matter of any one of Examples 68 to 83 can optionally include wherein the composite signal further includes noise, and wherein the signal power measurement is a signal power measurement of the noise and the second received signal.

In Example 85, the subject matter of any one of Examples 68 to 84 can optionally include wherein the first wireless network utilizes a first radio frequency band that overlaps with a second radio frequency band utilized by the second wireless network.

In Example 86, the subject matter of any one of Examples 68 to 85 can optionally include wherein the first wireless network utilizes a shared frequency with the second wireless network.

In Example 87, the subject matter of any one of Examples 68 to 86 can optionally include wherein the first wireless network utilizes a shared frequency with the second wireless network as part of a spectrum sharing system.

In Example 88, the subject matter of any one of Examples 68 to 87 can optionally include wherein the first wireless network is a licensee in a spectrum sharing system and the second wireless network is an incumbent in the spectrum sharing system.

In Example 89, the subject matter of Example 88 can optionally include wherein the spectrum sharing system is a Licensed Shared Access (LSA) system or a Spectrum Access System (SAS) system.

In Example 90, the subject matter of Example 88 or 89 can optionally include wherein the first wireless network is located in a protection zone of the spectrum sharing system.

In Example 91, the subject matter of any one of Examples 68 to 90 can optionally include wherein the first wireless network is operated by a different network operator than the second wireless network.

Example 92 is a mobile terminal including a radio processing circuit and a baseband processing circuit configured to interact with the radio processing circuit to transmit and receive radio signals, the baseband processing circuit further configured to perform the method of any one of Examples 68 to 91.

Example 93 is a non-transitory computer readable medium storing instructions which when executed by a processor control the processor to perform the method of any one of Examples 68 to 91.

Example 94 is a baseband processing circuit configured to retrieve instructions from a memory which when executed by the baseband processing circuit control the baseband processing circuit to perform the method of any one of Examples 68 to 91.

Example 95 is a network control system for a first wireless network including a network control circuit configured to manage radio communications of the first wireless network, the network control circuit further configured to estimate a proximity to a second wireless network for a plurality of user terminals based on a measurement of the second wireless network reported by the plurality of user terminals, select one or more measurement terminals from the plurality of user terminals based on the estimated proximity of the plurality of user terminals, and receive one or more interference measurements from the one or more measurement terminals that indicate interference to the second wireless network related to the first wireless network.

In Example 96, the subject matter of Example 95 can optionally further include a radio transceiver configured to transmit and receive radio signals on the first wireless network.

In Example 97, the subject matter of Example 95 or 96 can optionally include wherein the first wireless network and the second wireless network operate on a shared frequency band.

In Example 98, the subject matter of any one of Examples 95 to 97 can optionally include wherein the network control circuit is configured to select one or more measurement terminals from the plurality of user terminals based on the estimated proximity of the plurality of user terminals by selecting one or more of the plurality of user terminals that report the strongest measurements of the second wireless network as the one or more measurement terminals.

In Example 99, the subject matter of any one of Examples 95 to 98 can optionally include wherein the network control circuit is configured to estimate a proximity to a second wireless network for a plurality of user terminals based on a measurement of the second wireless network reported by the plurality of user terminals by determining that one or more first user terminals of the plurality of user terminals that report strong measurements are located closer to the second wireless network than one or more second user terminals of the plurality of user terminals that report weak measurements.

In Example 100, the subject matter of any one of Examples 95 to 99 can optionally include wherein the network control circuit is further configured to receive the measurement of the second wireless network from each respective user terminal of the plurality of user terminals.

In Example 101, the subject matter of Example 95 can optionally include wherein the network control circuit is configured to estimate a proximity to a second wireless network for a plurality of user terminals based on a measurement of the second wireless network reported by the plurality of user terminals by estimating the proximity to the second wireless network for the plurality of user terminals relative to the proximity of the other user terminals of the plurality of user terminals to the second wireless network based on the measurement of the second wireless network reported by the plurality of user terminals.

In Example 102, the subject matter of Example 95 can optionally include wherein the measurement of the second wireless network reported by the plurality of user terminals is a signal power measurement of the second wireless network, and wherein the network control circuit is configured to estimate a proximity to a second wireless network for a plurality of user terminals based on a measurement of the second wireless network reported by the plurality of user terminals by ranking the plurality of user terminals in order according to the signal power measurement reported by the plurality of user terminals.

In Example 103, the subject matter of Example 95 can optionally include wherein the measurement of the second wireless network reported by the plurality of user terminals is a signal power measurement of the second wireless network, and wherein the network control circuit is configured to estimate a proximity to a second wireless network for a plurality of user terminals based on a measurement of the second wireless network reported by the plurality of user terminals by performing at least one of ranking the plurality of user terminals according to the signal power measurement reported by the plurality of user terminals, comparing a signal power measurement reported by a first user terminal of the plurality of user terminals to a signal power measurement reported by a second user terminal of the plurality of user terminals, comparing the signal power measurement reported by the plurality of user terminals to a signal power threshold, or calculating an approximate proximity from the second wireless network based on the signal power measurement.

In Example 104, the subject matter of Example 95 can optionally include wherein the network control circuit is further configured to estimate a proximity to a transmission point of the first wireless network of a further plurality of user terminals based on a measurement of the transmission point reported by the further plurality of user terminals, and select the plurality of user terminals from the further plurality of user terminals based on the estimated proximity of the further plurality of user terminals from the transmission point.

In Example 105, the subject matter of Example 104 can optionally include wherein the network control circuit is further configured to select the user terminals of the further plurality of user terminals that have the farthest estimated proximity from the transmission point as the plurality of user terminals.

In Example 106, the subject matter of any one of Examples 95 to 105 can optionally include wherein the network control circuit is further configured to determine whether to perform uplink power control based on the one or more interference measurements.

In Example 107, the subject matter of Example 106 can optionally include wherein the network control circuit is configured to determine whether to perform uplink power control based on the one or more interference measurements by determining to perform uplink power control if the one or more interference measurements indicate excessive interference to the second wireless network.

In Example 108, the subject matter of Example 107 can optionally include wherein the network control circuit is further configured to select one or more target user terminals from the plurality of user terminals to reduce allocated uplink transmit power based on the estimated proximity of the one or more target user terminals from the second wireless network.

In Example 109, the subject matter of Example 108 can optionally include wherein the network control circuit is further configured to transmit control signaling to the one or more target terminals that specifies a reduction in uplink transmit power allocation.

In Example 110, the subject matter of Example 106 can optionally include wherein the network control circuit is configured to determine whether to perform uplink power control based on the one or more interference measurements by comparing the one or more interference measurements to a predetermined interference threshold, and determining to perform uplink power control if the one or more interference measurements satisfy the predetermined interference threshold.

In Example 111, the subject matter of Example 110 can optionally include wherein the first wireless network is a licensee in a spectrum sharing system and the second wireless network is an incumbent in the spectrum sharing system, and wherein the predetermined interference threshold is based on an incumbent protection interference threshold of the spectrum sharing system.

In Example 112, the subject matter of Example 111 can optionally include wherein the first wireless network is located in a protection zone of the spectrum sharing system and the incumbent protection interference threshold is an interference threshold for the protection zone.

In Example 113, the subject matter of Example 110 can optionally include wherein the network control circuit is configured to determine whether to perform uplink power control based on the one or more interference measurements by determining not to perform uplink power control if the one or more interference measurements is below the predetermined interference threshold.

In Example 114, the subject matter of any one of Examples 95 to 113 can optionally include wherein the measurement of the second wireless network reported by a first user terminal of the plurality of user terminals is a signal power measurement that indicates a signal power of a signal received by the first user terminal from the second wireless network.

In Example 115, the subject matter of any one of Examples 95 to 114 can optionally include wherein the plurality of user terminals utilize a first radio frequency band that overlaps with a second radio frequency band utilized by the second wireless network.

In Example 116, the subject matter of any one of Examples 95 to 115 can optionally include wherein the first wireless network utilizes a shared frequency with the second wireless network.

In Example 117, the subject matter of any one of Examples 95 to 116 can optionally include wherein the first wireless network utilizes a shared frequency with the second wireless network as part of a spectrum sharing system.

In Example 118, the subject matter of any one of Examples 95 to 117 can optionally include wherein the first wireless network is a licensee in a spectrum sharing system and the second wireless network is an incumbent in the spectrum sharing system.

In Example 119, the subject matter of Example 118 can optionally include wherein the spectrum sharing system is a Licensed Shared Access (LSA) system or a Spectrum Access System (SAS) system.

In Example 120, the subject matter of Example 118 or 119 can optionally include wherein the first wireless network is located in a protection zone of the spectrum sharing system.

In Example 121, the subject matter of any one of Examples 95 to 120 can optionally include wherein the control device is a base station of the first wireless network.

In Example 122, the subject matter of any one of Examples 95 to 121 can optionally include wherein the control device is located at a base station of the first wireless network.

In Example 123, the subject matter of any one of Examples 95 to 122 can optionally include wherein the first wireless network is operated by a different network operator than the second wireless network.

In Example 124, the subject matter of any one of Examples 95 to 123 can optionally include configured as a base station of the first wireless network.

Example 125 is a network control system for a first wireless network including a network control circuit configured to manage radio communications of the first wireless network, the network control circuit further configured to estimate a proximity to a second wireless network for a plurality of user terminals based on a measurement of the second wireless network reported by the plurality of user terminals, determine whether the second wireless network is experiencing excessive interference from the first wireless network, and if the second wireless network is experiencing excessive interference from the first wireless network, adjust a transmit power allocation of one or more selected user terminals of the plurality of user terminals based on the estimated proximity to the second wireless network for the one or more selected user terminals.

In Example 126, the subject matter of Example 125 can optionally include wherein the first wireless network and the second wireless network operate on a shared frequency band.

In Example 127, the subject matter of Example 125 or 126 can optionally include wherein the network control circuit is further configured to if the second wireless network is not experiencing excessive interference from the first wireless network, perform one of maintaining the transmit power allocation of the one or more selected user terminals, or increasing the transmit power allocation of one or more further user terminals of the plurality of user terminals.

In Example 128, the subject matter of Example 127 can optionally include wherein the network control circuit is configured to increase the transmit power allocation of one or more further user terminals of the plurality of user terminals by selecting one or more user terminals of the plurality of user terminals that have far estimated proximities to the second wireless network as the one or more further user terminals.

In Example 129, the subject matter of Example 125 can optionally include wherein the network control circuit is further configured to select the one or more selected user terminals from the plurality of user terminals based on which of the plurality of user terminals have close estimated proximities to the second wireless network.

In Example 130, the subject matter of Example 125 can optionally include wherein the network control circuit is configured to adjust a transmit power allocation of one or more selected user terminals of the plurality of user terminals based on the estimated proximity to the second wireless network for the one or more selected user terminals by selecting one or more user terminals of the plurality of user terminals that have close estimated proximities to the second wireless network as the one or more selected user terminals, and reducing the transmit power allocation of the one or more selected user terminals.

In Example 131, the subject matter of Example 125 can optionally include wherein the network control circuit is configured to adjust a transmit power allocation of one or more selected user terminals of the plurality of user terminals based on the estimated proximity to the second wireless network for the one or more selected user terminals by selecting one or more user terminals of the plurality of user terminals that have close estimated proximities to the second wireless network as the one or more selected user terminals, and allocating zero uplink transmit power for the one or more selected user terminals.

In Example 132, the subject matter of any one of Examples 125 to 131 can optionally include wherein the network control circuit is further configured to receive one or more interference measurements from one or more measurement terminals, and wherein the network control circuit is configured to determine whether the second wireless network is experiencing excessive interference from the first wireless network by determining whether the second wireless network is experiencing excessive interference from the first wireless network based on the one or more interference measurements.

In Example 133, the subject matter of Example 132 can optionally include wherein the one or more measurement terminals are user terminals of the plurality of user terminals.

In Example 134, the subject matter of Example 132 can optionally include wherein the network control circuit is further configured to select one or more measurement terminals from the plurality of user terminals, and receive one or more one or more interference measurements from one or more measurement terminals, and wherein the network control circuit is configured to determine whether the second wireless network is experiencing excessive interference from the first wireless network by determining whether the second wireless network is experiencing excessive interference from the first wireless network based on the one or more interference measurements.

In Example 135, the subject matter of Example 134 can optionally include wherein the network control circuit is configured to determine whether the second wireless network is experiencing excessive interference from the first wireless network based on the one or more interference measurements by determining whether the one or more interference measurements satisfy predetermined interference criteria.

In Example 136, the subject matter of Example 135 can optionally include wherein the first wireless network is a licensee in a spectrum sharing system and the second wireless network is an incumbent in the spectrum sharing system, and wherein the predetermined interference criteria is interference criteria of the spectrum sharing system.

In Example 137, the subject matter of Example 135 can optionally include wherein the first wireless network operates in a protection zone of the spectrum sharing system, and wherein the predetermined interference criteria is protection zone interference criteria.

In Example 138, the subject matter of Example 134 can optionally include wherein the network control circuit is configured to determine whether the second wireless network is experiencing excessive interference from the first wireless network based on the one or more interference measurements by comparing the one or more interference measurements to a predetermined interference threshold.

In Example 139, the subject matter of Example 138 can optionally include wherein the first wireless network is a licensee in a spectrum sharing system and the second wireless network is an incumbent in the spectrum sharing system, and wherein the predetermined interference threshold is an interference threshold of the spectrum sharing system.

In Example 140, the subject matter of Example 134 can optionally include wherein the network control circuit is configured to select one or more measurement terminals from the plurality of user terminals by selecting the one or more measurement terminals from the plurality of user terminals based on the estimated proximity to the second wireless network for the one or more measurement terminals.

In Example 141, the subject matter of Example 140 can optionally include wherein the network control circuit is configured to select the one or more measurement terminals from the plurality of user terminals based on the estimated proximity to the second wireless network for the one or more measurement terminals by selecting one or more user terminals of the plurality of user terminals that have the closest estimated proximities to the second wireless network of the plurality of user terminals as the one or more measurement terminals.

In Example 142, the subject matter of any one of Examples 125 to 141 can optionally include wherein the network control circuit is configured to adjust a transmit power allocation of one or more selected user terminals of the plurality of user terminals based on the estimated proximity to the second wireless network for the one or more selected user terminals by transmitting control signaling to the one or more selected user terminals that specifies an adjustment in transmit power allocation.

In Example 143, the subject matter of any one of Examples 125 to 142 can optionally include wherein the network control circuit is configured to adjust a transmit power allocation of one or more selected user terminals of the plurality of user terminals based on the estimated proximity to the second wireless network for the one or more selected user terminals by selecting one or more user terminals of the plurality of user terminals that report the strongest measurements of the second wireless network as the one or more selected terminals, and reducing the transmit power allocation of the one or more selected user terminals.

In Example 144, the subject matter of Example 125 can optionally include wherein the network control circuit is configured to estimate a proximity to a second wireless network for a plurality of user terminals based on a measurement of the second wireless network reported by the plurality of user terminals by determining that one or more first user terminals of the plurality of user terminals that report strong measurements of the second wireless network are located closer to the second wireless network than one or more second user terminals of the plurality of user terminals that report weak measurements of the second wireless network.

In Example 145, the subject matter of Example 125 can optionally include wherein the network control circuit is configured to estimate a proximity to a second wireless network for a plurality of user terminals based on a measurement of the second wireless network reported by the plurality of user terminals by estimating the proximity to the second wireless network for the plurality of user terminals relative to the proximity of the other user terminals of the plurality of user terminals to the second wireless network based on the measurement of the second wireless network reported by the plurality of user terminals.

In Example 146, the subject matter of Example 125 can optionally include wherein the measurement of the second wireless network reported by the plurality of user terminals is a signal power measurement of the second wireless network, and wherein the network control circuit is configured to estimate a proximity to a second wireless network for a plurality of user terminals based on a measurement of the second wireless network reported by the plurality of user terminals by ranking the plurality of user terminals in order according to the signal power measurement reported by the plurality of user terminals.

In Example 147, the subject matter of any one of Examples 125 to 146 can optionally include wherein the measurement of the second wireless network reported by a first user terminal of the plurality of user terminals is a signal power measurement that indicates a signal power of a signal received by the first user terminal from the second wireless network.

In Example 148, the subject matter of any one of Examples 125 to 147 can optionally include wherein the plurality of user terminals utilize a first radio frequency band that overlaps with a second radio frequency band utilized by the second wireless network.

In Example 149, the subject matter of any one of Examples 125 to 148 can optionally include wherein the first wireless network utilizes a shared frequency with the second wireless network.

In Example 150, the subject matter of any one of Examples 125 to 149 can optionally include wherein the first wireless network utilizes a shared frequency with the second wireless network as part of a spectrum sharing system.

In Example 151, the subject matter of any one of Examples 125 to 150 can optionally include wherein the first wireless network is a licensee in a spectrum sharing system and the second wireless network is an incumbent in the spectrum sharing system.

In Example 152, the subject matter of Example 151 can optionally include wherein the spectrum sharing system is a Licensed Shared Access (LSA) system or a Spectrum Access System (SAS) system.

In Example 153, the subject matter of Example 151 or 152 can optionally include wherein the first wireless network is located in a protection zone of the spectrum sharing system.

In Example 154, the subject matter of any one of Examples 125 to 153 can optionally include wherein the first wireless network is operated by a different network operator than the second wireless network.

In Example 155, the subject matter of any one of Examples 125 to 154 can optionally include configured as a base station of the first wireless network.

Example 156 is a mobile terminal including a radio processing circuit and a baseband processing circuit configured to interact with the radio processing circuit to transmit and receive radio signals, the baseband processing circuit further configured to receive a composite signal including a first received signal from a first wireless network and a second received signal from a second wireless network, calculate a correlation between the composite signal and a local reference signal to determine a signal power measurement of the second received signal, report the signal power measurement to the first wireless network as a measurement report, and receive control signaling in response to the measurement report that specifies an assigned operation configuration for the user terminal.

In Example 157, the subject matter of Example 156 can optionally include wherein the first wireless network and the second wireless network operate on a shared frequency band.

In Example 158, the subject matter of Example 156 or 157 can optionally include wherein the baseband processing circuit is configured to receive control signaling in response to the measurement report that specifies an operation assignment for the user terminal by receiving a measurement operation assignment, the baseband processing circuit further configured to perform an interference measurement that indicates interference to the second wireless network, and report the interference measurement to the first wireless network.

In Example 159, the subject matter of Example 158 can optionally include wherein the interference measurement indicates interference to the second wireless network related to the first wireless network.

In Example 160, the subject matter of Example 158 can optionally include wherein the baseband processing circuit is configured to perform an interference measurement that indicates interference to the second wireless network by subtracting a downlink reference signal power measurement from an uplink signal power measurement to obtain a signal power measurement difference, and subtracting an estimated reference signal power measurement from the signal power measurement difference to obtain the interference measurement.

In Example 161, the subject matter of any one of Examples 156 to 160 can optionally include wherein the baseband processing circuit is configured to receive control signaling in response to the measurement report that specifies an operation assignment for the user terminal by receiving a transmit power operation assignment that specifies a transmit power, the baseband processing circuit further configured to transmit signals according to the transmit power.

In Example 162, the subject matter of any one of Examples 156 to 161 can optionally include wherein the baseband processing circuit is configured to calculate a correlation between the composite signal and a local reference signal to determine a signal power measurement of the second received signal by calculating a cross-correlation between the composite signal and the local reference signal to obtain the signal power measurement of the second received signal.

In Example 163, the subject matter of any one of Examples 156 to 161 can optionally include wherein the baseband processing circuit is configured to calculate a correlation between the composite signal and a local reference signal to determine a signal power measurement of the second received signal by calculating a cross-correlation between the composite signal and the local reference signal to obtain a reference signal channel response, calculating a reference signal power measurement from the reference signal channel response, and subtracting the reference signal power measurement from a signal power measurement of the composite signal to obtain the signal power measurement of the second received signal.

In Example 164, the subject matter of Example 163 can optionally include wherein the baseband processing circuit is configured to calculate a cross-correlation between the composite signal and the local reference signal to obtain a reference signal channel response by calculating the cross-correlation between the composite signal and the local reference signal in the frequency domain to obtain the reference signal channel response as a reference signal channel frequency response.

In Example 165, the subject matter of Example 164 can optionally include wherein the baseband processing circuit is configured to calculate a reference signal power measurement from the reference signal channel response by calculating the reference signal power measurement from the reference signal channel frequency response.

In Example 166, the subject matter of any one of Examples 156 to 165 can optionally include wherein the first received signal includes a downlink reference signal transmitted by a transmission point of the first wireless network.

In Example 167, the subject matter of Example 166 can optionally include wherein the baseband processing circuit is configured to receive a composite signal including a first received signal from a first wireless network and a second received signal from a second wireless network by receiving the composite signal during a downlink reference signal occasion of the first wireless network.

In Example 168, the subject matter of Example 166 can optionally include wherein the downlink reference signal is uncorrelated with the second received signal.

In Example 169, the subject matter of any one of Examples 166 to 168 can optionally include wherein the downlink reference signal is a Primary Synchronization Signal (PSS), a Secondary Synchronization Signal (SSS), or a Cell-specific Reference Signal (CRS).

In Example 170, the subject matter of Example one can optionally include Examples 156 to 169, wherein the baseband processing circuit is configured to report the signal power measurement to the first wireless network as a measurement report by transmitting the measurement report to an access point of the first wireless network.

In Example 171, the subject matter of any one of Examples 156 to 170 can optionally include wherein the baseband processing circuit is configured to receive a composite signal including a first received signal from a first wireless network and a second received signal from a second wireless network by receiving the composite signal during a downlink subframe of the first wireless network or receiving the composite signal on a downlink frequency band of the first wireless network.

In Example 172, the subject matter of any one of Examples 156 to 171 can optionally include wherein the composite signal further includes noise, and wherein the signal power measurement is a signal power measurement of the noise and the second received signal.

In Example 173, the subject matter of any one of Examples 156 to 172 can optionally include wherein the first wireless network utilizes a first radio frequency band that overlaps with a second radio frequency band utilized by the second wireless network.

In Example 174, the subject matter of any one of Examples 156 to 173 can optionally include wherein the first wireless network utilizes a shared frequency with the second wireless network.

In Example 175, the subject matter of any one of Examples 156 to 174 can optionally include wherein the first wireless network utilizes a shared frequency with the second wireless network as part of a spectrum sharing system.

In Example 176, the subject matter of any one of Examples 156 to 175 can optionally include wherein the first wireless network is a licensee in a spectrum sharing system and the second wireless network is an incumbent in the spectrum sharing system.

In Example 177, the subject matter of Example 176 can optionally include wherein the spectrum sharing system is a Licensed Shared Access (LSA) system or a Spectrum Access System (SAS) system.

In Example 178, the subject matter of Example 176 or 177 can optionally include wherein the first wireless network is located in a protection zone of the spectrum sharing system.

In Example 179, the subject matter of any one of Examples 156 to 178 can optionally include wherein the first wireless network is operated by a different network operator than the second wireless network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A network control system configured to manage radio communications devices for a Spectrum Access System (SAS) shared spectrum wireless network, the network control system comprising:
   a receiver to receive initial measurements from a plurality of user terminals and determine an estimate of a proximity to a Priority Access License (PAL) radio communication device for the plurality of user terminals and an estimate of a proximity to a General Authorized Access (GAA) radio communication device for the plurality of user terminals; and
   a processor, operably coupled to the receiver, configured to cause a user terminal to be configured to perform interference measurements based on the estimate of the proximity to the PAL radio communication device and the estimate of the proximity to the GAA radio communication device,
   wherein the estimate of the proximity to the PAL radio communication device is based on ranking the plurality of user terminals based on their respective initial measurements of signals transmitted by the PAL radio communication device.

2. The network control system of claim 1, wherein the processor is configured to select a plurality of measurement user terminals, including the user terminal, from the plurality of user terminals based on the estimate of the proximity by:
   selecting a first subset of the plurality of user terminals that have a higher ranking of the plurality of user terminals based on their respective initial measurements of signals transmitted by the PAL radio communication device as the plurality of measurement user terminals.

3. The network control system of claim 1, wherein the processor is configured to estimate the proximity to the PAL radio communication device for the plurality of user terminals by:
   determining that one or more first user terminals of the plurality of user terminals that are ranked higher are located closer to the PAL radio communication device than one or more second user terminals of the plurality of user terminals that are ranked lower.

4. The network control system of claim 1, wherein the initial measurements reported for the plurality of user terminals are signal power measurements, and wherein the processor is configured to perform at least one of:

ranking the plurality of user terminals according to each user terminal's respective signal power measurement reported by the PAL radio communication device;

comparing a signal power measurement reported for a first user terminal of the plurality of user terminals to a signal power measurement reported for a second user terminal of the plurality of user terminals;

comparing each of the signal power measurements reported for the plurality of user terminals to a signal power threshold; or calculating an approximate proximity to the PAL radio communication device based on the signal power measurements.

5. The network control system of claim 1, wherein the processor is further configured to determine whether to perform uplink power control based on the interference measurements.

6. The network control system of claim 5, wherein the processor is configured to determine whether to perform uplink power control based on the interference measurements by:

determining to perform uplink power control if the interference measurements indicate excessive interference to the PAL radio communication device.

7. The network control system of claim 6, wherein the processor is further configured to select one or more target user terminals from the plurality of user terminals to reduce allocated uplink transmit power based on the estimated proximity of the one or more target user terminals from the PAL radio communication device.

8. The network control system of claim 5, wherein the processor is configured to determine whether to perform uplink power control based on the interference measurements by:

comparing the interference measurements to a predetermined interference threshold; and determining to perform uplink power control if the interference measurements satisfy the predetermined interference threshold.

9. The network control system of claim 1, wherein the processor is further configured to select one or more user terminals from the plurality of user terminals based on the one or more user terminals having closer estimated proximities to the PAL radio communication device compared to other user terminals of the plurality of user terminals.

10. The network control system of claim 1, wherein the processor is configured to adjust a transmit power allocation of one or more user terminals of the plurality of user terminals based on the estimated proximity to the PAL radio communication device for the one or more user terminals by:

selecting one or more user terminals of the plurality of user terminals that have close estimated proximities to the PAL radio communication device as the one or more selected user terminals; and reducing the transmit power allocation of the one or more selected user terminals.

11. The network control system of claim 1, wherein the performed interference measurements includes an interference measurement indicative of interference to the PAL radio communication device from the GAA radio communication device.

12. The network control system of claim 1, wherein the estimate of the proximity to the PAL radio communication device is based on an Observed Time Difference of Arrival positioning based on signals transmitted from the PAL radio communication device.

13. The network control system of claim 12, wherein the ranking of the plurality of user terminals includes Quality of Signal (QoS) and/or signal power measurements.

14. The network control system of claim 1, wherein the estimate is based on a comparison of the initial measurements of signals.

* * * * *